United States Patent [19]

Werner et al.

[11] 3,916,123

[45] Oct. 28, 1975

[54] EVENT MONITORING TRANSCEIVER

[75] Inventors: Leroy H. Werner, Burlington; John E. Litzinger, Cherry Hill, both of N.J.

[73] Assignee: Telesciences, Inc., Moorestown, N.J.

[22] Filed: Sept. 20, 1974

[21] Appl. No.: 507,937

[52] U.S. Cl. ......... 179/175.2 C; 179/8 A; 179/7.1 R

[51] Int. Cl.$^2$ ........................................ H04M 3/22

[58] Field of Search ............ 179/175.2 C, 8 A, 8 R, 179/7 R, 7.1 R, 9, 15 BF

[56] References Cited

UNITED STATES PATENTS

| | | | |
|---|---|---|---|
| 3,018,334 | 1/1962 | Middaugh | 179/8 A |
| 3,099,819 | 7/1963 | Barnes | 179/8 A |
| 3,158,687 | 11/1964 | Long | 179/8 A |
| 3,868,480 | 2/1975 | Murgio et al. | 179/8 A |

*Primary Examiner*—Douglas W. Olms

[57] ABSTRACT

A data terminal utilizes a time division multiplexer to monitor traffic on up to 10240 input lines in groups of 1024 lines and converts the information in each group from parallel to serial form as 1024 serial 12 bit parallel words, records the event count data and usage time duration for each input line, and under interrogation by a control center transmits accumulated event count and usage time data over a phone line as a serial message of 1024 groups of six characters, three characters designating event count and three characters designating usage time.

The terminal has up to ten parallel synchronously operating memory groups, one for each group of 1024 lines, each memory group containing an accumulating memory which counts the events as they occur and a passive memory which upon command receives data from the accumulating memory. Data in any accumulating memory or passive memory may be read out of the terminal on command from a remote supervising unit. Accumulation operation of the terminal is automatic, and data readout and subsequent clearing of the registers and counters is controlled by the remote supervising unit. The condition of each line is examined continuously cyclically to determine the presence or absence of an event and the duration of such event. A multiple sampling technique is utilized to distinguish the presence of an event from noise.

32 Claims, 16 Drawing Figures

TIMING GENERATOR

8 BIT BINARY COUNTER & DECODE NETWORK

MEMORY

READ OUT FORMAT

BIA1 06/28 10/00 - 0000/;

| | | | | | | | | |
|---|---|---|---|---|---|---|---|---|
| 000 | 000/000 | 030/006 | 066/003 | 044/002 | 000/000 | 093/010 | 045/003 | 040/004 |
| 001 | 000/000 | 000/000 | 037/001 | 000/000 | 023/001 | 052/001 | 016/002 | 040/003 |
| 002 | 093/025 | 046/001 | 000/000 | 041/003 | 087/001 | 008/002 | 000/000 | 040/003 |
| ¦ | | | | | | | | |
| 127 | 009/002 | 093/029 | 079/003 | 000/000 | 000/000 | 000/000 | 035/005 | 040/003: |

READ OUT SEQUENCER

EVENT MONITORING TRANSCEIVER

This invention relates generally to event monitoring transceiver apparatus for monitoring a plurality of independent event generating systems, determining when events have occurred on each system and the duration of such events, storing the monitored data in a plurality of locations, transferring data stored in certain locations to other locations, and transmitting the data stored at any specified location to a remote supervising source upon command from the latter.

For illustrative purposes the invention will be described and illustrated as embodied in an automatic traffic monitoring terminal used for the automatic collection of telephone traffic data. The traffic data monitored could be for example the number and duration of calls on a given trunk or group of trunks, the number of times and duration that all trunks or line finders were busy, or any other "event" occurring on a line that provides a signal proper for recording by the terminal.

Briefly, the illustrated terminal embodiment of the invention utilizes time division multiplexing to monitor traffic on up to 10240 separate lines, these lines being handled in groups of 1024 lines so that up to ten such groups may be incorporated into a terminal. All such groups are operated synchronously and in parallel by a common line and memory address module so that only 1024 line and memory addresses are necessary to handle up to the full terminal complement of 10240 monitored lines.

The multiplexing is carried out in a two stage parallel/serial sequence. The 1024 lines are divided into 128 sequential groups of 8 lines. The data on each 8 line group is made available for examination by a parallel transfer, and the data on these lines is then looked at in serial sequence. When all 8 lines of a group have been examined, the data on the next 8 line group is parallel transferred for serial examination.

Each 1024 line group has a memory group associated with it, each such memory group including an active and a passive memory for monitored event count data, and an active and passive memory for monitored event time duration data. Accordingly, up to ten such memory groups may be provided in a terminal. The monitored data is accumulated in each of the active memories as 1024 serial 12 bit parallel words, and, upon command is transferrable to the associated passive memories. Additionally, upon command, the stored data is selectively readable out of any specified active or passive memory in the terminal.

One 32 character field of the four field 128 character ASCII Code is utilized to designate 32 separate memory groups so that 32 separate memories can be communicated with by a remote supervising source. Since a terminal has been defined for illustrative purposes as having a maximum capacity of ten memory groups, the ASCII code provides a bridge by means of which a supervising computer can from a single port communicate with a plurality of terminals located remotely from one another. Means are provided so that the specific memory addressed of the 32 possible memories is indentified as present by the terminal where it is located, and is identified as not being present by all other terminals.

In order to minimize the recording of noise on a line as true data, each line is examined at spaced time intervals and an event is recorded as true data only after at least three successive line examinations or looks shown an event present condition followed by three successive line examinations or looks which show an event absent condition. The times between looks for both event present and event absent conditions are selectable and may be different from one another. Similarly, time duration data is only recorded when three successive looks show an event present condition, and the times between successive looks and between groups of three successive looks are selectable and may be different from one another. An important feature of the invention is its ability to simultaneously provide both event count data and line usage time data from a single monitored point by means of physically small, reliable, and relatively inexpensive means.

A primary object of the invention is to provide a novel event monitoring transceiver apparatus for monitoring a plurality of independent event generating systems, storing the monitored data, and transmitting the stored data to a remote interrogating source upon command of the latter.

Another object of the invention is to provide a novel event monitoring apparatus as aforesaid wherein each monitored event generating system is monitored to determine the number of events which have occurred during a particular time interval, called peg data, and the time duration of all such events, called usage data, both the peg data and the usage data being derived from a single monitoring point.

A further object of the invention is to provide a novel event monitoring apparatus as aforesaid in which the apparatus is provided with a plurality of memory groups, each such memory group including an active or accumulating memory for both peg and usage data and including a passive or static memory for previously accumulated peg and usage data, and wherein means are provided for selectively transferring the contents of the active memory to the passive memory within a selected memory group or in all memory groups.

Yet another object of the invention is to provide a novel event monitoring apparatus as aforesaid including means wherein the contents of either the active or passive memory within any memory group can be read out and transmitted to a remote interrogating source upon command of the latter.

Still a further object of the invention is to provide a novel event monitoring apparatus as aforesaid wherein the peg data for each event generating system is incremented only after at least three successive time spaced examinations of the system condition show an event-present condition followed by three successive time spaced examinations which show an event-absent condition.

Another object of the invention is to provide a novel event monitoring apparatus as aforesaid wherein the usage data for each event generating system is incremented after each group of three successive time spaced examinations of the system condition show an event-present condition.

Yet a further object of the invention is to provide a novel event monitoring apparatus as aforesaid wherein the time between peg data event-present condition examinations is selectable, and wherein the time between peg data event-absent condition examinations is selectable and may be the same as or different from that selected for the event-present condition examination.

Still another object of the invention is to provide a novel event monitoring apparatus as aforesaid wherein the time between usage data event-present condition examinations is selectable, and wherein the time interval between successive groups of three examinations for event-present condition is selectable.

The foregoing and other objects of the invention will appear more fully hereinafter from a reading of the following specification and claims in conjunction with an examination of the appended drawings, wherein:

FIG. 1 is an overall functional block diagram of the apparatus according to the invention;

FIGS. 2 through 8 are more detailed logic diagrams of functional blocks 2 through 8 respectively of FIG. 1, that is, FIG. 2 is a more detailed logic diagram of the Timing generator logic of functional block 2 of FIG. 1; FIG. 3 is a more detailed logic diagram of the Memory Address logic of functional block 3 of FIG. 1; and so forth;

In the several figures, like elements are denoted by like reference characters.

Figure 1:
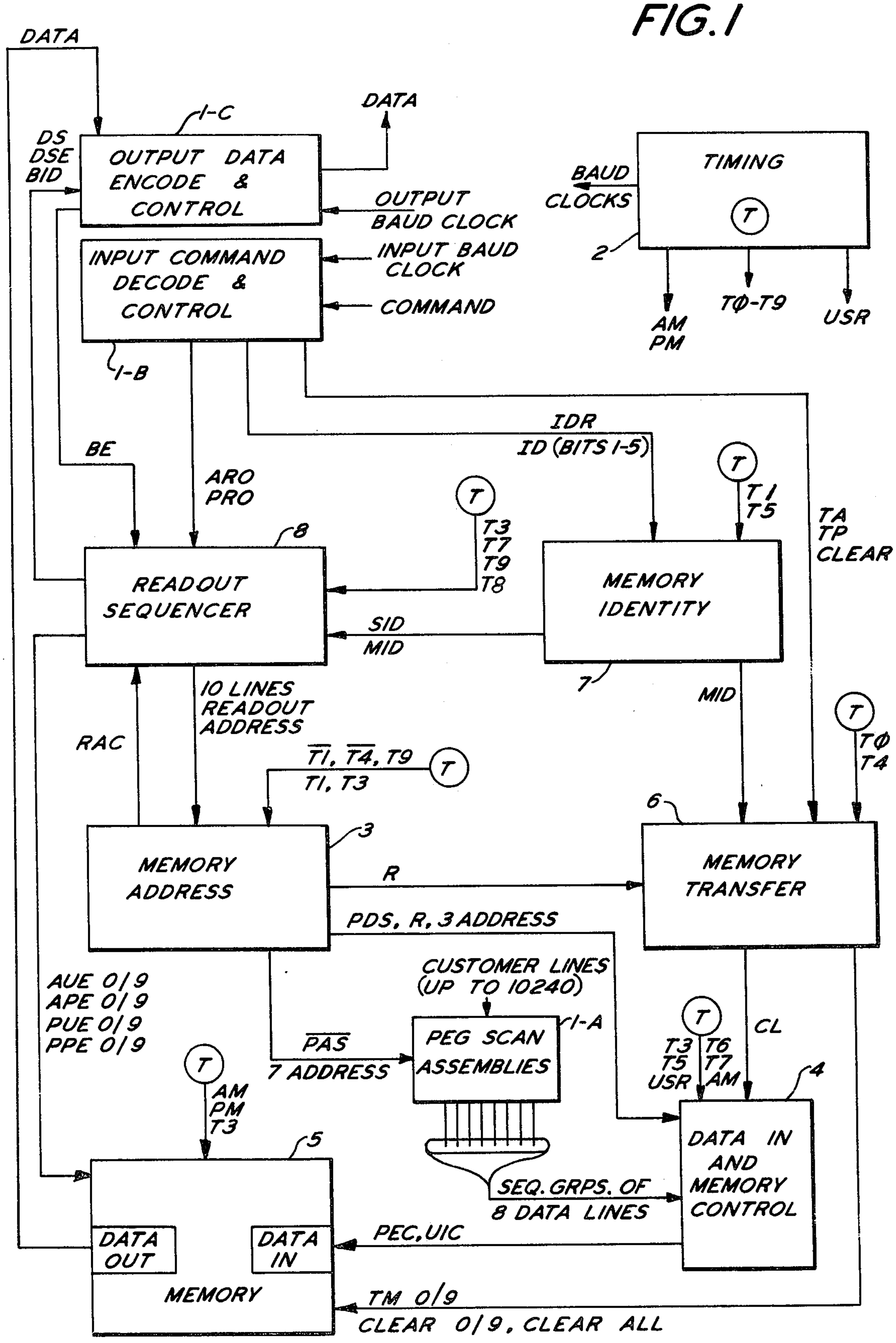
Figure 2:
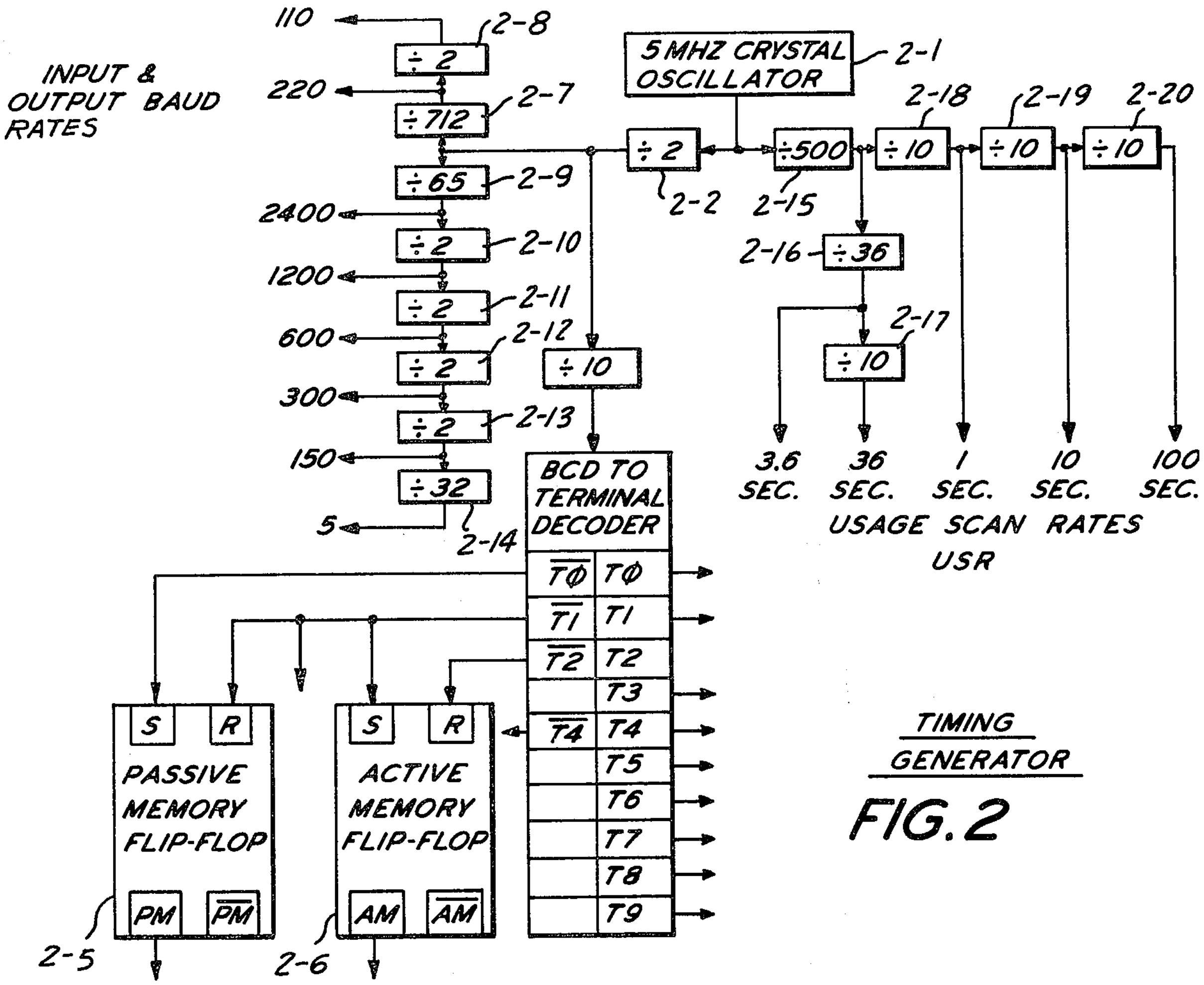
Figure 14:
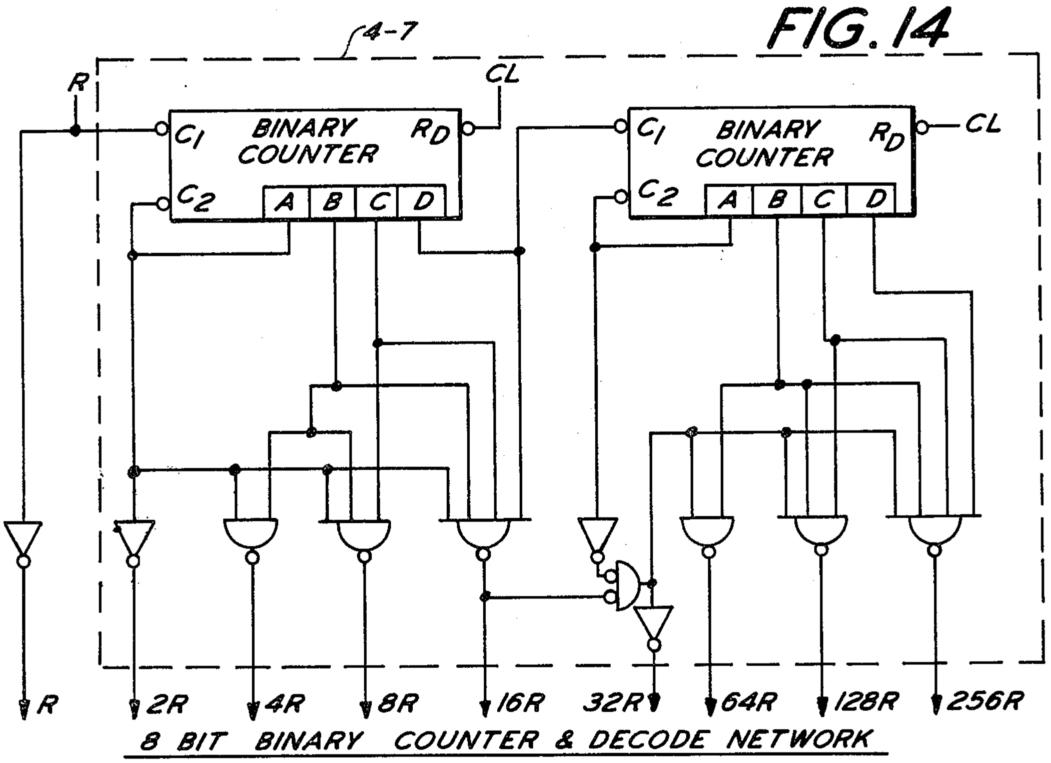
FIG. 14 is a detailed logic diagram of the 8 Bit Binary Counter and Decoder shown in FIG. 4.
Figure 3:
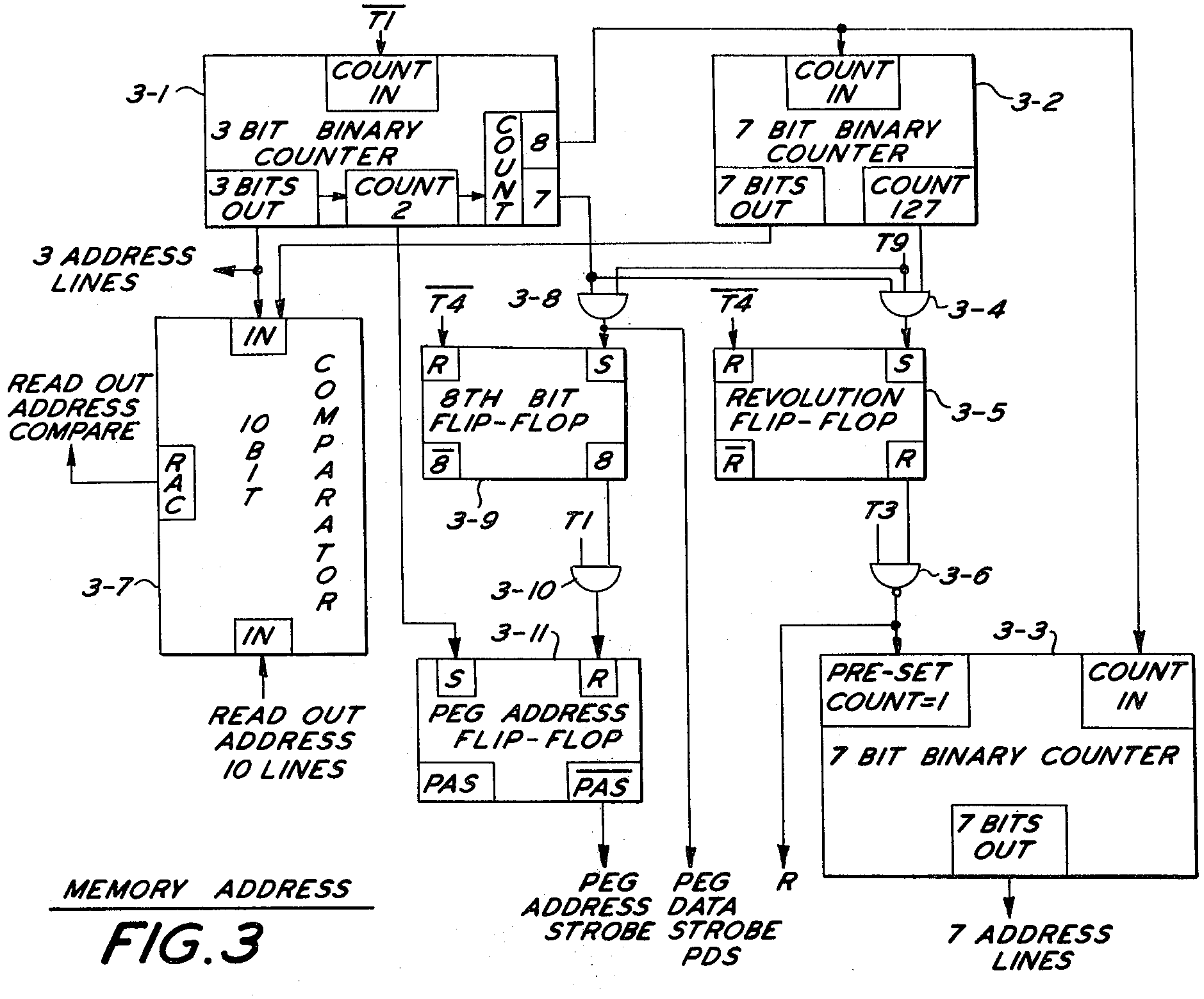
Figure 4:
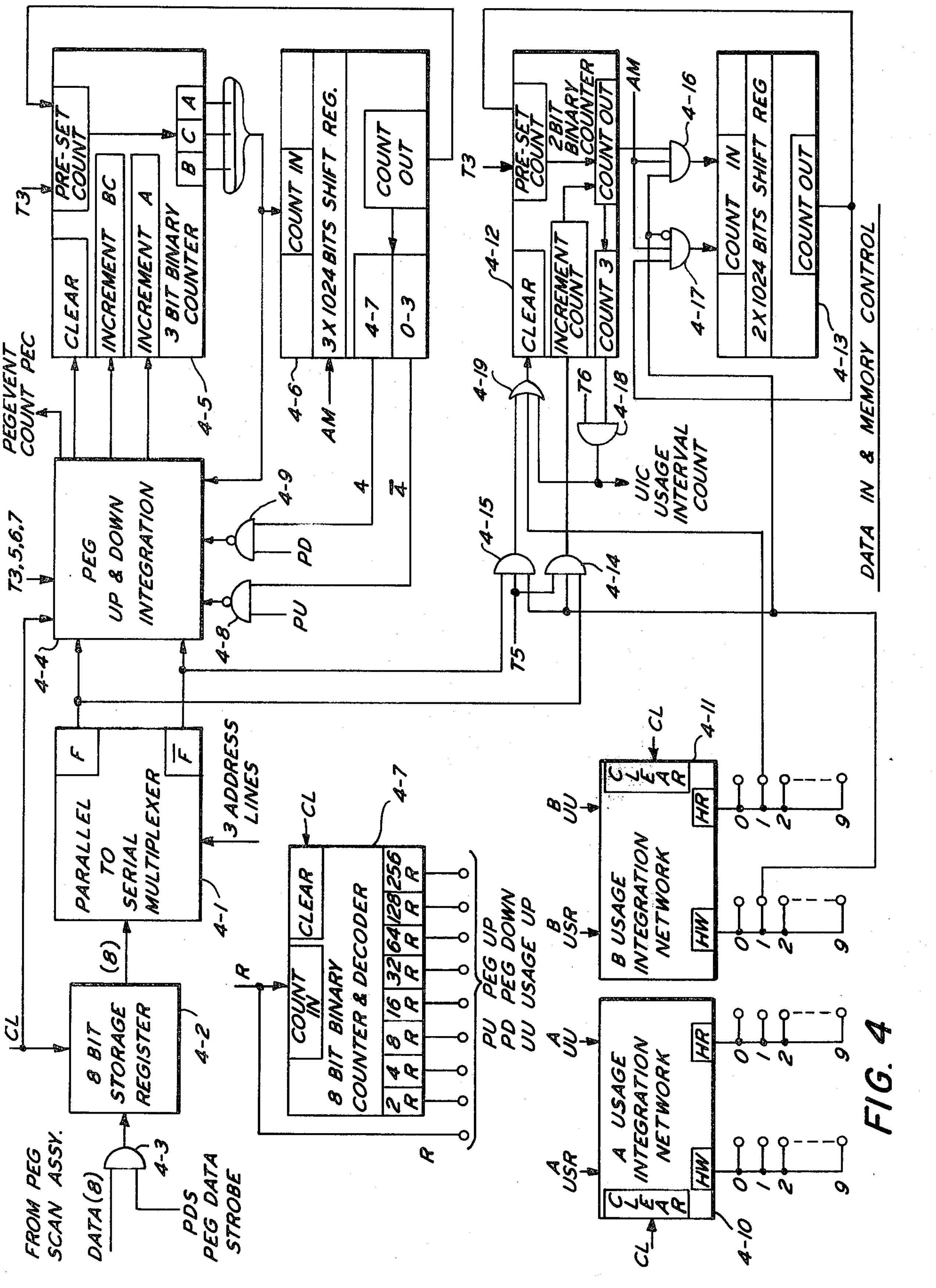
Figures 5, 16:
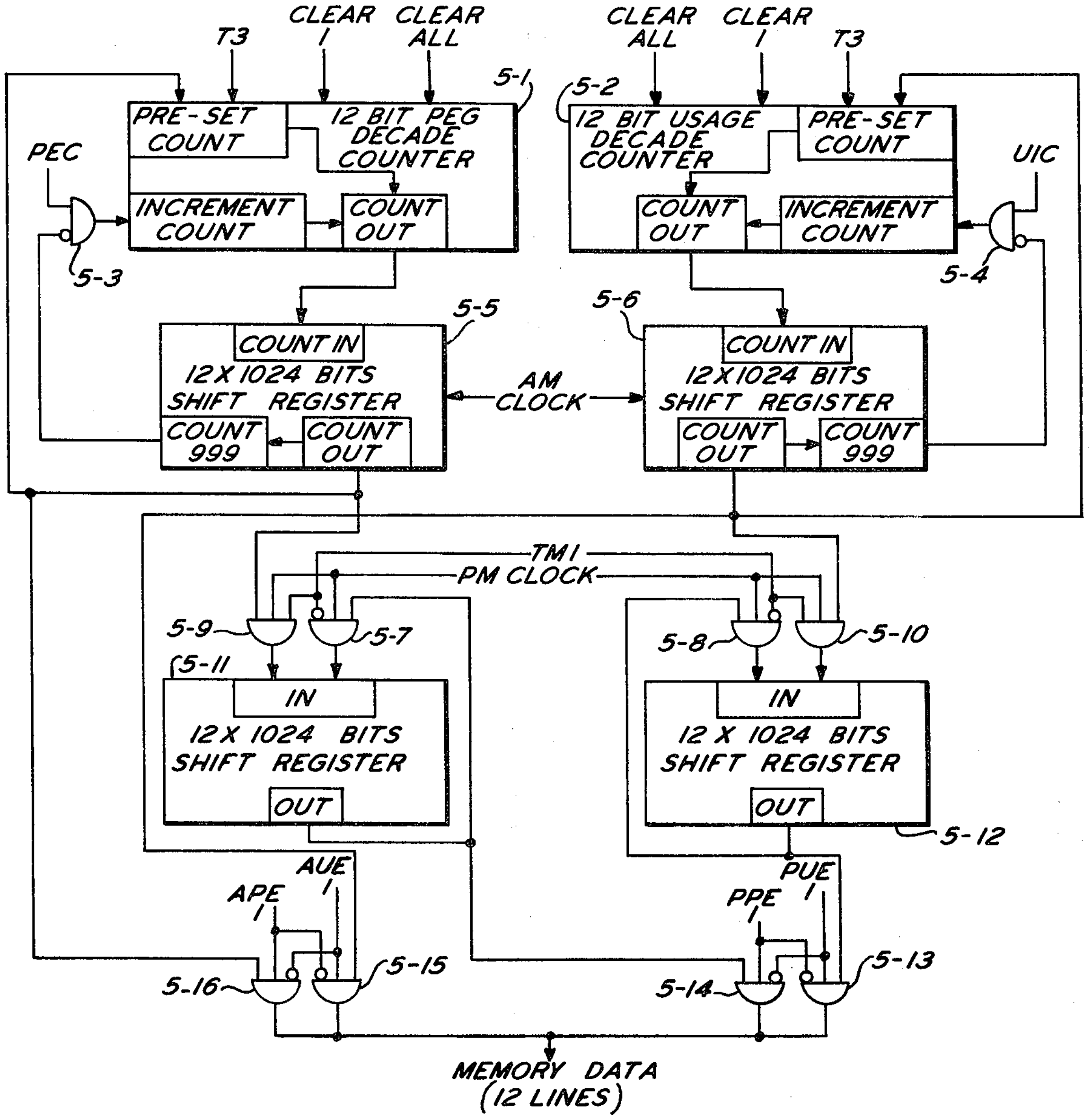
FIG. 16 shows a typical read out format.
Figure 7:
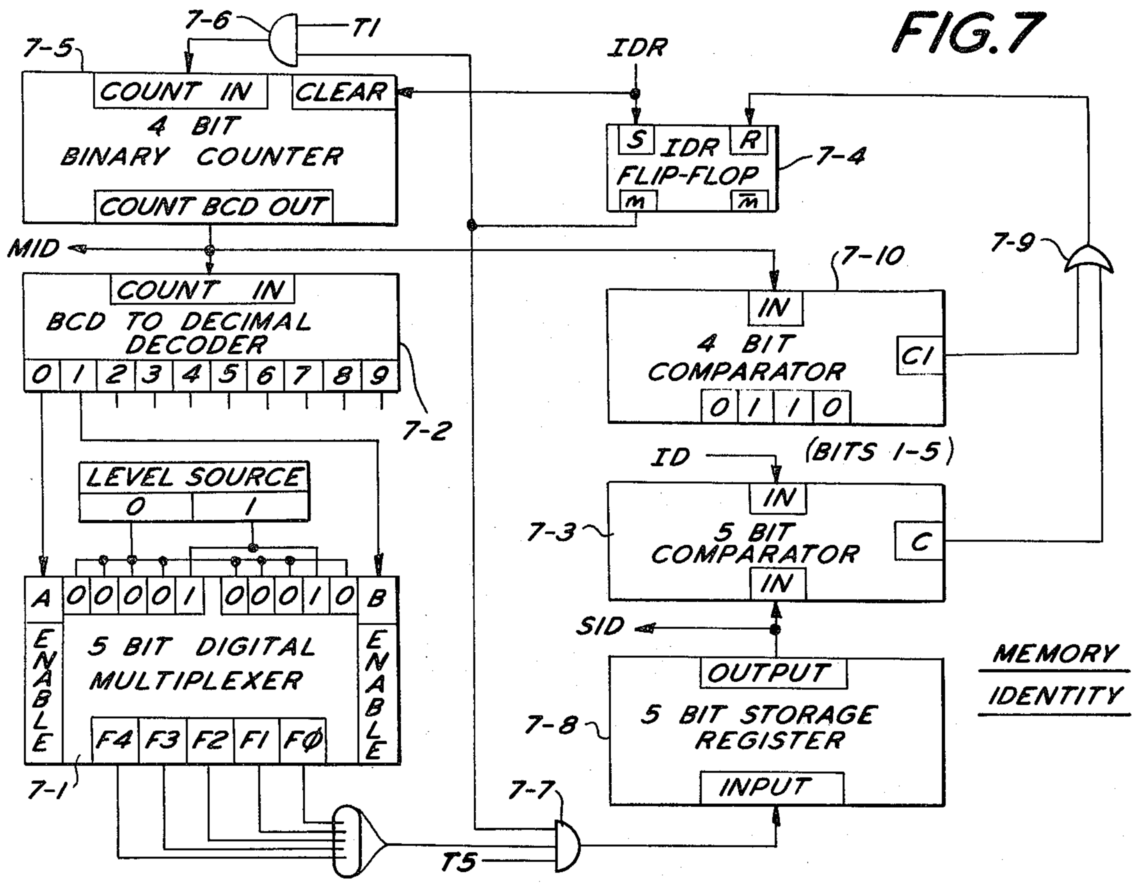
Figure 6:
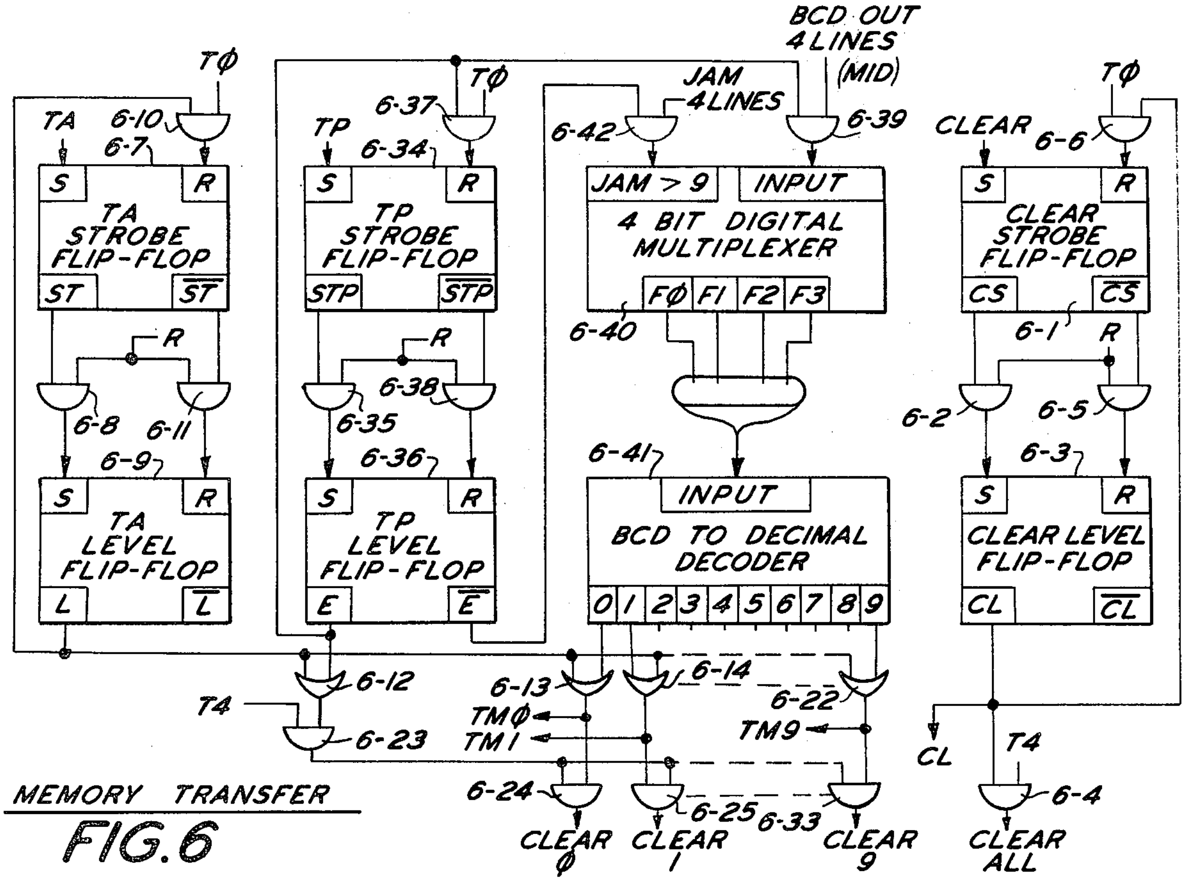
Figure 8:
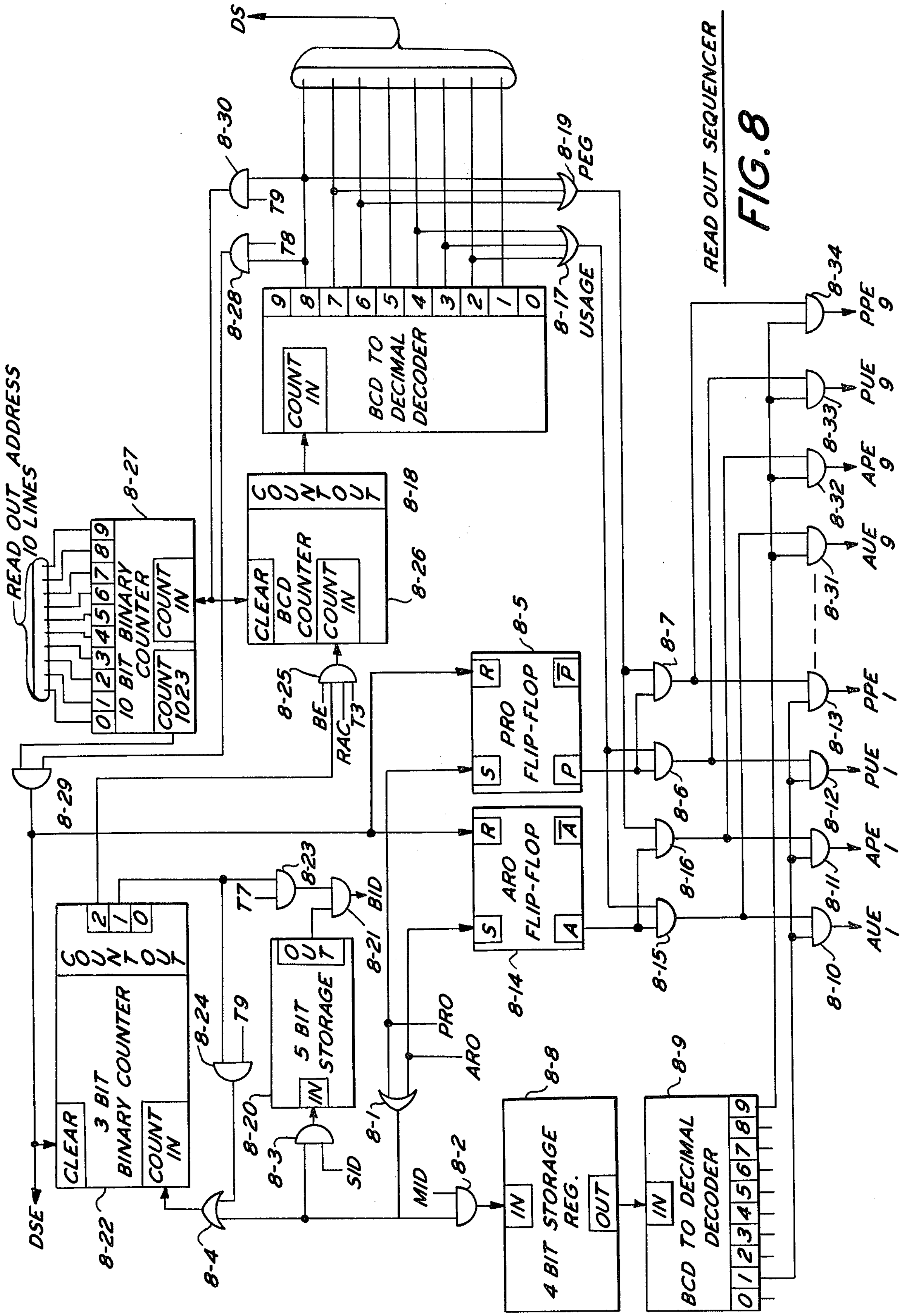
Figure 9:
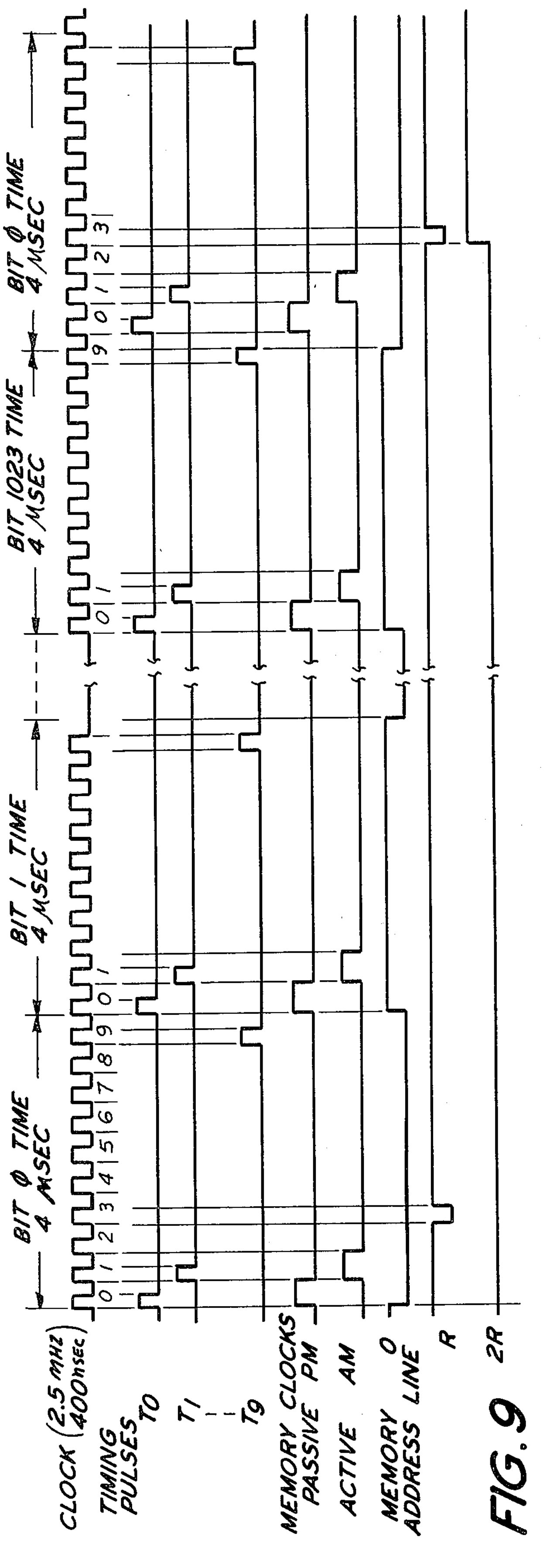
Figure 11:
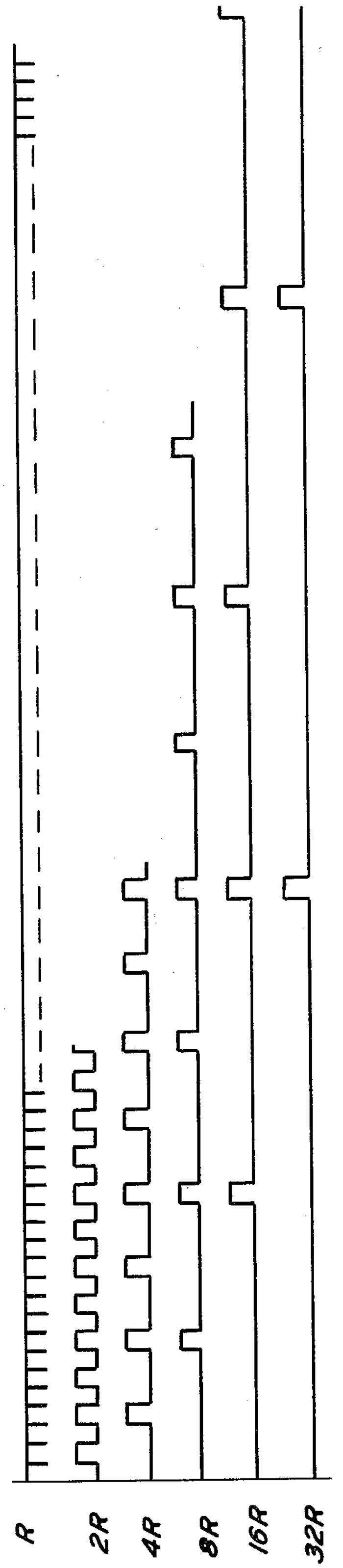

A more complete understanding of the invention can best be had by first considering the overall operation of the apparatus, and then considering the detailed means for carrying out the various operations. Accordingly, the invention as embodied in the illustrated apparatus is hereinafter described in the following sections:

GENERAL DESCRIPTION — FIG. 1
TIMING — FIGS. 2,3,9,10,11
TIMING GENERATOR — FIGS. 2,9
MEMORY ADDRESS — FIGS. 3,9,10,11
PEG AND USAGE EVENT DETECTION — FIGS. 4,9,10,11,12,13,14,15
PEG EVENT COUNT (PEC) — FIGS. 4,9,10,11,13,14
USAGE INTERVAL COUNT (UIC) — FIGS. 4,11,12,14,15
PEG AND USAGE DATA STORAGE — FIG. 5
EXTERNALLY CONTROLLED FUNCTIONS — FIGS. 3,4,5,6,7,8,16
CLEAR ALL MEMORIES — FIGS. 6,5,4
TRANSFER ALL MEMORIES — FIGS. 6,5
MEMORY GROUP IDENTIFICATION — FIG. 7
SELECTIVE MEMORY TRANSFER — FIGS. 6,5
SELECTIVE MEMORY READ OUT — FIGS. 8,5,3,16

GENERAL DESCRIPTION - FIG. 1

As shown in the functional block diagram of FIG. 1, up to 10240 input lines may be connected to the terminal through the Peg Scan Assemblies 1-A. The peg scan assemblies are standard pieces of time division multiplexing equipment which per se do not form a part of the invention, but which are necessary in order to read data into the apparatus according to the invention. A typcial peg scan assembly has privisions for connection to 1024 lines which are sequentially scanned in groups of a particular number of lines. In the description of the apparatus which follows, the lines connected to the peg scan assemblies are examined in groups of eight lines, so that the 1024 lines which are connected to one peg scan assembly will be examined in 128 sequential groups of eight lines each. The apparatus according to the invention is capable of accomodating for example up to ten peg scan assemblies in a single terminal so that a terminal capability would constitute a maximum of 10240 lines in the case where all ten assemblies were provided.

The sequential scanning of the lines to which the peg scan assemblies are connected, and the insertion of the data derived from those lines into memory locations which correspond to each individual line which is examined, is controlled by the Memory Address block 3 and the Data In and Memory Control block 4. Both the Memory Address block 3 and the Data In and Memory Control block 4 receive timing signals from the Timing Generator block 2 which continuously cyclically generates a series of timing pulses $T\phi$ through T9 which together constitute one bit time. One bit time corresponds to the time allocated to perform all of the data scan functions connected with any single input line connected to the peg scan assembly. For example, a specific line connected to the Peg Scan Assemblies 1-A will be examined during bit zero time and the next successive line to be scanned will be examined during bit 1 time, followed by the next successive line being scanned during bit 2 time, and so on. Since there are 1024 lines in a peg scan assembly, after all 1024 lines have been examined, the re-examination of the first line of that 1024 line group will again be carried out, and so on cyclically. Accordingly, one complete scanning of all 1024 lines of a peg scan assembly will take 1024 bit times, and this interval of 1024 bit times is called one revolution.

The Timing Generator also generates aan AM CLOCK signal and a PM CLOCK signal once during each bit time, these clock signals being utilized during the process of data accumulation and memory transfers to be subsequently discussed, and in connection with the clocking of certain events in the Data In and Memory Control block 4. A series of usage scan rate USR signals and a number of baud clock are also generated by the Timing Generator block 2, the USR signal being routed to the Data In and Memory Control block 4 where it is utilized in the accumulation of usage interval count data.

The Memory Address block 3 generates a number of signals which are routed to the Peg Scan Assemblies 1-A and to the Data In and Memory Control block 4. The $\overline{PAS}$ and seven address signals from the Memory Address block 3 to the Peg Scan Assemblies block 1-A determine which particular group of eight input lines will be examined during any given time, the address of the particular group of eight such lines being contained in the seven address signals. The PDS, R and three address signals generated by the Memory Address block 3 and routed to the Data In and Memory Control block 4 determine which specific one of the eight data lines in the group selected by the seven address signals will be examined at any particular time and during which revolutions they will be examined.

The Data In and Memory Control block 4 examines the data presented to it from the peg scan assemblies and determines whether an event has occurred on each and every line which is examined, and also determines the total length of time that events have occurred on each line. This information is encoded into the PEC and UIC signals and sent to Memory block 5 where it is stored in the memory location which corresponds to each line monitored by the peg scan assemblies. Accordingly, for each peg scan assembly having 1024 lines monitored, the Memory block 5 contains memory groups having 1024 descrete memory locations, one for each line. The Memory block 5 contains one memory group or bank for each peg scan assembly monitoring 1024 lines, so that in a full terminal there would be ten such memory groups numbered from φ to 9.

Each memory group contains shift registers designated as active memory storage and passive memory storage. The active memory storage is the memory which accumulates peg event count data and usage interval count data on a currently accumulating basis, there being separate memory storage for the peg events and separate memory storage for the usage count. Each of the active memories has associated with it a passive memory into which the contents of the associated active memory are transferred upon receipt of a specific transfer command.

The transfer command is generated by the Memory Transfer block 6 in the form of transfer memory signals which are designated as TMφ through TM9 signals, the number associated with the transfer signal designating the memory group to which that signal is directed. For example, the downstream computer may issue a command received at the Input Command Decode and Control block 1-B designating that the contents of active memory 3 shall be transferred to the passive memory 3. This command would be decoded and routed to the Memory Transfer block 6 as a TP signal, and routed to the Memory Identity block 7 as the ID and IDR signals, TP standing for "turn page" and designating a particular memory group to which the transfer command relates. The ID and IDR signals cause the Memory Identity block 7 to generate an MID signal which identifies memory group 3. The TP signal, together with the MID signal from Memory Identity block 7, causes the Memory Transfer block 6 to generate a TM3 signal which causes the transfer to occur and also causes the generation of a CLEAR 3 signal which in turn causes the active memory from which the data is being transferred to be cleared.

A similar command may also be received which is designated as the "turn all" signal and which is a direction to cause the contents of all of the active memories in the terminal to be transferred to their associated passive memories. This command is decoded in the Decode and Control block 1-B and routed to the Memory Transfer block 6 as the TA signal. The TA signal causes the Memory Transfer block 6 to generate the entire sequence to TMφ through TM9 signals and all of the CLEAR φ through CLEAR 9 signals, thereby causing all of the memories to be transferred and the active memories to be cleared.

Additionally, it may on occasion be desired to clear all the memories. Such a clear situtation will occur when power is initially turned on, but it may also be desired to cause a memory clear-out at some time during the normal data accumulation time. This is accomplished when the Input Command Decode and Control block 1-B generates a CLEAR signal which it routes to Memory Transfer block 6 in response to the receipt of a CLEAR command. The CLEAR signal received by Memory Transfer block 6 causes the generation of the CLEAR ALL signal which is routed to Memory block 5 to clear the memories there, and also cause the generation of the CL signal which is routed to the Data In and Memory Control block 4 where it clears the storage and count registers, decoders and integration networks contained therein.

The accumulated data stored in the memory groups of Memory block 5 may be read out through the Output Data Encode and Control block 1-C upon receipt of an input command from a supervising computer directing which specific data is to be read out. Since each memory group contains active memory for peg and usage data and also contains passive memory for peg and usage data, each memory group contains four data sections from which information may be read out. However, since the usage interval information is not particularly meaningful apart from the related peg event count information, the data is read out so that both the peg and usage data for the active memories will be read out, and both the peg and usage data for the passive memories will be read out. Accordingly, two different read outs from each memory group are made available, one read out for the active memories and another read out for the passive memories. Since a terminal may contain, in this illustrative example, up to ten separate memory groups, it will be understood that twenty separate commands for memory read out must be provided for in order to be albe to selectively read the data out of any particular memory of the memory groups. Such a command contains a memory group identifier and a command portion which also designates whether it is the active or the passive memory which is to be read out from.

Upon receipt of the appropriate command by the Input Command Decode and Control block 1-B, the latter generates either an ARO or a PRO signal to the Read Out Sequencer block 8 designating whether it is active read out or passive read out which is desired, and also generates the IDR and ID signals which are routed to the Memory Identity block 7. The Memory Identity block 7, as previously described, determines whether or not the particular memory being searched for is in that particular terminal. If the memory is not located in that terminal, when a search for identity of all the memory groups contained in the terminal indicates that the desired memory group is not present, the search is discontinued and the command is ignored.

However, if the sought for memory is in the terminal, the Memory Identity block 7 generates the MID signal which is routed to the Memory Transfer block 6 and to the Read Out Sequencer 8, the SID signal also being generated and sent to the Read Out Sequencer. The Read Out Sequencer synchronizes the high speed data transfer from the Memory 5 to the Output Data Encode and Control block 1-C with the low speed conversions of those data signals to data signals sent out over the telephone line, for example in the form of teletype characters.

It carries out the synchronization by generating a ten line read out address which is compared in the Memory Address block 3 with the ten line address being continuously generated there on the three address and seven address signal lines. When a match is found, the Memory Address block 3 sends back an RAC signal to the Read Out Sequencer indicating that the right memory location has been found for data read out. If the Read Out Sequencer is also receiving a BE signal from the Output Data Encode and Control block 1-C indicating that the output buffer is empty and is available for the receipt of some data, the Read Out Sequencer 8 generates the appropriate signals and transmits them to the Memory block 5 to cause the memory output gates to open and permit data to read out to the Output Data Encode and Control block 1-C.

The signals generated by the Read Out Sequencer 8 which cause the selective data read out are shown as AUE φ/9, APE φ/9, PUE φ/9 and PPE φ/9. The AUE signal stands for Active Usage Enable and is an enabling signal which is applied to the output gate of the selected memory group φ through 9. Similarly, the APE signal is the Active Peg Enable signal, the PUE signal is the Passive Usage Enable signal and the PPE is the Passive Peg Enable signal. In an actual read out operation, if for example, the incoming command had directed the read out of the passive memory information in memory group 3, the signals which would be generated at the appropriate times would be first the PUE 3 signal calling for read out of the passive memory usage information from memory group 3, and when the data had been read out for a particular line, it would be followed by the PPE 3 signal calling for the read out of the passive peg information data in the memory group 3 for the same line. This sequence of PUE 3 and PPE signals is carried out for each bit position or memory location of the entire 1024 such locations in the memory group, and is continued until all of the data has been read out. The Read Out Sequencer 8 then terminataes the read out operation.

TIMING — FIGS. 2,3,9,10,11

TIMING GENERATOR — FIGS. 2 and 9

Referring now to FIG. 2 which shows the detailed logic of the Timing Generator block 2 of FIG. 1, it is observed that the timing signals are all derived from a 5 MHZ crystal oscillator 2-1, the output of which is divided by three timing chains to generate three groups of timing signals. The basic timing for the various internal operations of the apparatus is derived by dividing the basic oscillator rate through a divide by two network 2-2 to derive a 2.5 MHZ basic clock rate as shown on the top line of the timing waveform diagram of FIG. 9, each of the clock pulses measuring a 400 nanosecond or 0.4 microsecond time interval. As also shown by the clock waveform of FIG. 9, ten such clock cycles define a bit time of 4 microsecond duration. As will be subsequently seen, different timed events occur during the overall bit time, with such timed events being controlled by the occurrence of timing pulses Tφ through T9 which are derived from a BCD to Decimal Decoder 2-3 after the 2.5 MHZ clock has been divided by a divide by ten network 2–4.

The Tφ, T1 and T9 timing pulses are illustrated in the timing waveform diagram of FIG. 9, but it is to be understood that these do not constitute all of the timing pulses used but are only representative of the timing pulses shown in FIG. 2 as being generated and utilized in different parts of the apparatus. Also shown in FIG. 9 immediately below the timing pulse waveforms are memory clock waveforms designated as a passive PM CLOCK and an active AM CLOCK, these clock pulses occurring every bit time and being generated respectively by passive memory Flip-Flop 2-5 and active memory Flip-Flop 2-6. The PM CLOCK arises at the beginning of Tφ time and terminates at the beginning of T1 time, whereas the AM CLOCK arises at the beginning of T1 time and terminates at the beginning of T2 time.

Eight input and output baud clocks are also generated from the 2.5 MHZ clock signal by means of the eight divide networks 2–7 through 2–14. Each of the baud clocks is sixteen times the actual input and output baud rates, so that for example the 2400 baud rate corresponds to a baud clock of sixteen times 2400. Since one baud is one bit per second, this corresponds to an input or output rate of 2400 bits per second. In a system which required ten bits to designate one character, the input and/or output rate would accordingly be 240 characters per second, a relatively fast rate for teletype equipment which typically would be operated by data being read out of the apparatus at such a rate. Typically, data readout of the apparatus according to the invention would constitute a read-out into telephone lines which have limited bandwidth and therefore restrict the rate of information which can be transmitted over such lines.

Figure 15:
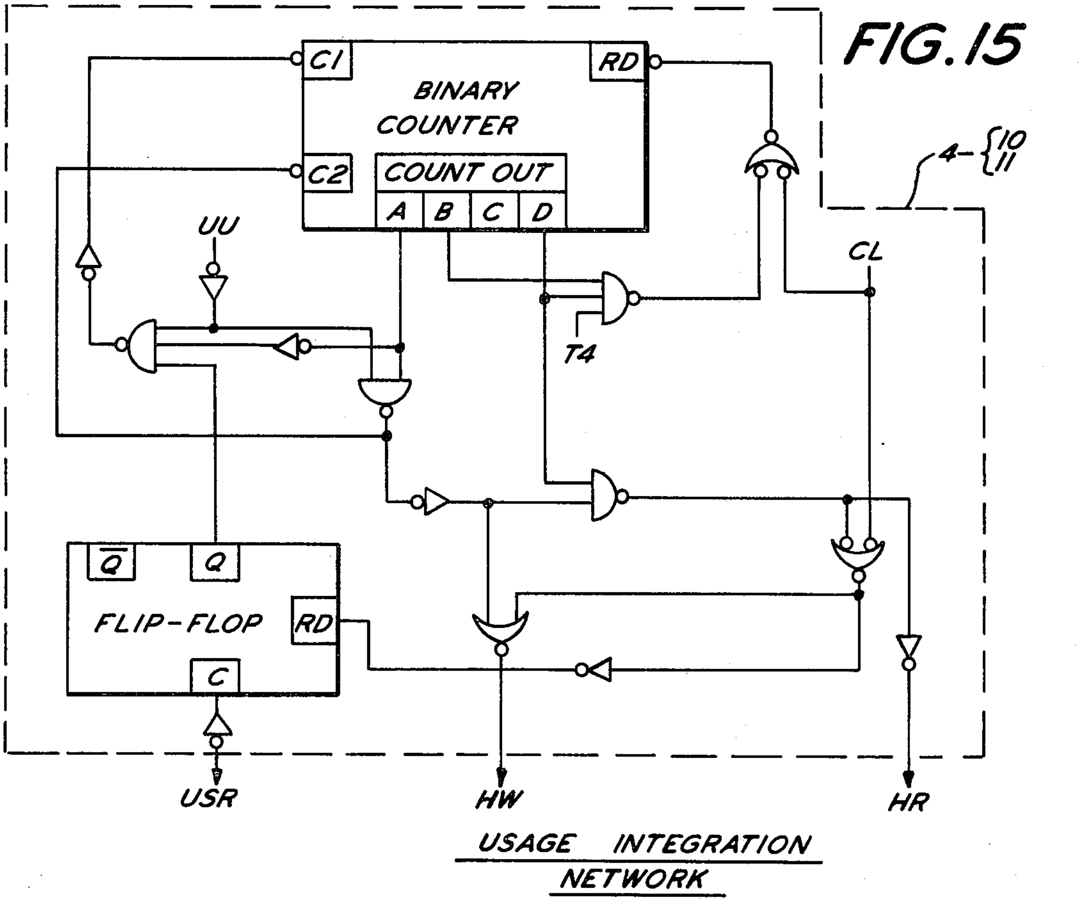
FIG. 15 is a detailed logic diagram of the Usage Integration Networks shown in FIG. 4.
Figure 13:
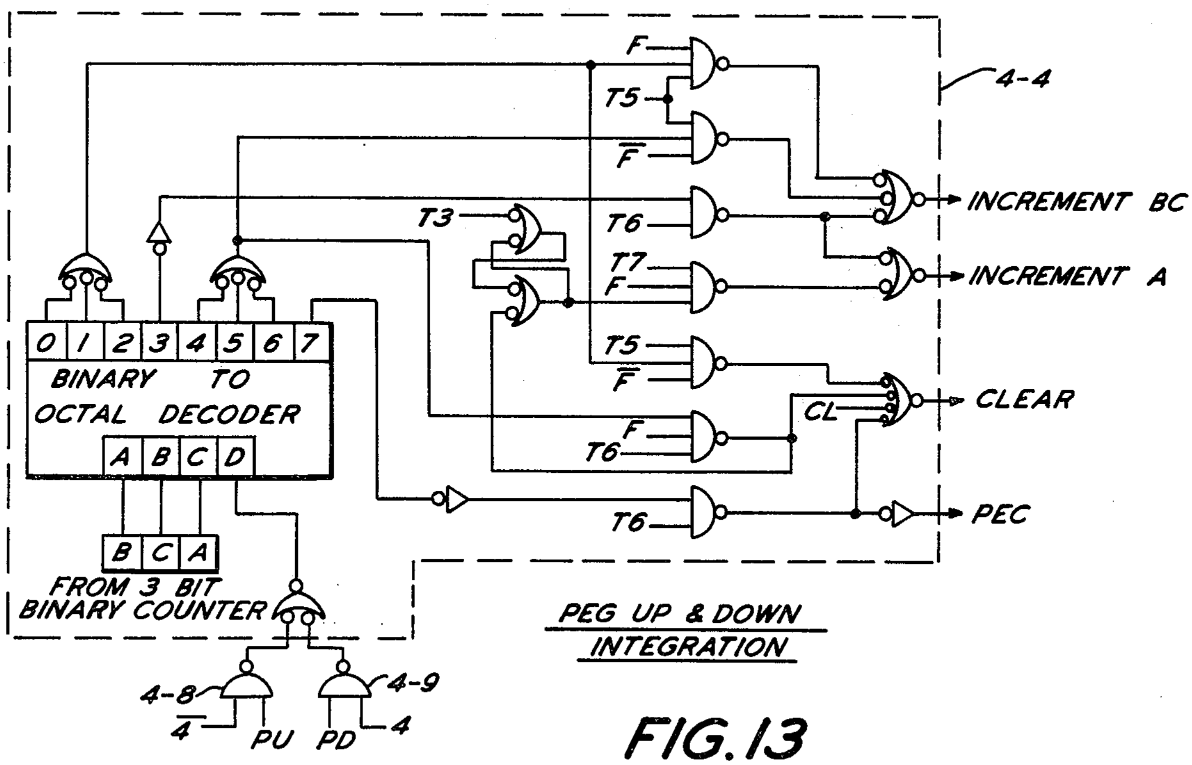
FIG. 13 is a detailed logic diagram of the Peg Up and Down Integration network shown in FIG. 4.

Finally, the output of the 5 MHZ oscillator is passed through a dividing network consisting of dividers 2–15 through 2–20 to generate a series of five usage scan rates, subsequently designated in other parts of the equipment as the USR signals. These signals, which occur once for each interval shown in FIG. 2, such as one second or one hundred second intervals, are the basic timing intervals which when correlated with the usage interval count signals to be subsequently described designate the length of time that a particular detected event condition has been found to exist. These USR pulses are selectable, and are used to generatate the HW and HR signals utilized in the manner shown in the Data-In and Memory Control block. Specific circuitry for generating the HW and HR signals by utilizing the USR signal is shown in FIG. 15.

MEMORY ADDRESS — FIGS. 3, 9, 10, 11

In order to take the data on the customer lines through the Peg Scan Assemblies block 1–A to the Data In and Memory Control block 4, the Memory Address block 3 generates a Peg Address Strobe signal $\overline{PAS}$, a Peg Data Strobe signal PDS and line address signals on the seven bit group address lines which indicate which group of eight customer lines are to be examined. This is accomplished by generating 128 separate addresses on the seven bit group address lines, each address sequentially selecting eight of the customer lines so that the 128 successive groups of eight customer lines correspond to the entire 1024 lines monitored by a single peg scan assembly. These address signals and the $\overline{PAS}$ signal are routed simultaneously to all of the up to ten peg scan assemblies which may be present in the apparatus, so that up to eighty lines may be addressed simultaneously. The $\overline{PAS}$ signal strobes the address into the peg scan assemblies so that the addressed lines are conditioned for data sampling when the Peg Data Strobe signal PDS is subsequently generated. As will be seen, the PDS signal strobes the selected data sample from the peg scan assemblies into the Data In and Memory Control block 4.

Referring to FIG. 3, the Peg Address Strobe $\overline{PAS}$ and the addresses on the seven bit group address lines are generated by a $\overline{T1}$ signal from the Timing block 2. Once every bit time, a $\overline{T1}$ pulse goes into the Count In input of 3 Bit Binary Counter 3–1, and every time eight $\overline{T1}$'s have been counted, an eight count is transmitted to the Count In input of the two 7 Bit Binary Counters 3–2 and 3–3. When Counter 3–2 counts to 127, representing 127 cycles of eight counts, and thereafter the count in 3 Bit Binary Counter 3–1 reaches seven, so that the totat count input at gate 3–4 is 1023, gate 3–4 is enabled so that the next T9 pulse passes through gate 3–4 and sets Revolution Flip-Flop 3–5 to produce an enabling R output on gate 3–6. The next T3 pulse-passes through gate 3–6 as the R signal which establishes the Bit $\phi$ time. It also sets in a first count to the 8 Bit Binary Counter and Decode Network 4–7 of the Data In and Memory Control block 4, and pre-sets the count in Binary counter 3–3 to a count of 1. Thus Binary Counter 3–2, having stepped through its maximum count is back at a zero count, whereas Binary Counter 3–3 which had also stepped back to its zero count is now advanced to a 1 count so that it shows a count of one higher than the count shown in Counter 3–2.

The next $\overline{T4}$ timing signal resets the Revolution Flip-Flop 3–5 and thereby removes the R signal from gate 3–6. Accordingly, since Binary Counter 3–2 has been stepped out of its 127 count state, gate 3–4 can not be enabled until 1023 bit times later, and another R signal will not be generated until Bit $\phi$ time of the next revolution which is 1024 bit times later. The R signal is shown on the timing waveform diagram of FIG. 9 as occurring at T3 of Bit $\phi$ time.

Figure 10:
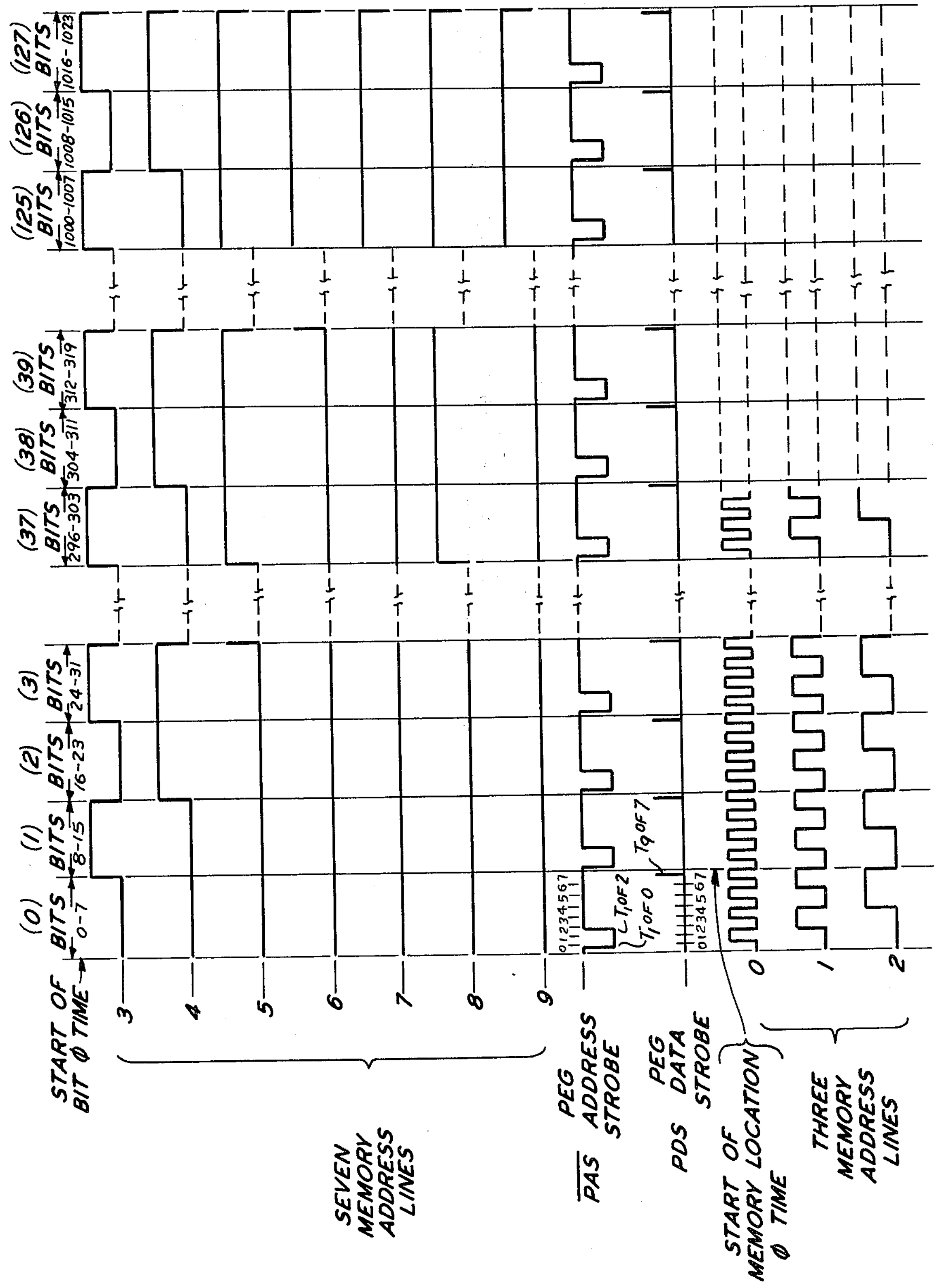

The address on the seven bit group address lines out of Binary Counter 3–3 changes one count every eight cycles of T1 pulses, whereas the three address line count out of Binary Counter 3–1 which discretely identifies each line in the addressed line group changes successively with every successive T1 pulse. The seven bit group address lines are shown in FIG. 10 as memory address lines 3–9, while the three address lines which identify each specific line in an eight line group are shown as memory address lines $\phi$ to 2. Memory address line $\phi$ is also shown on the expanded time scale diagram of FIG. 9 so that the waveforms of FIGS. 9 and 10 can be correlated. Consequently, the three address lines which are routed to the Data In and Memory Control block 4 cause the Parallel to Serial Multiplexer 4–1 therein to sequentially examine each of the eight bits stored in the 8 Bit Storage Register 4–2. When the ninth T1 pulse comes into the Binary Counter 3–1 it causes the three address lines to begin a new cycle scanning from the first to the eighth bit on the next group of eight data bits which will have been transferred from the eight addressed customer lines into the 8 Bit Storage Register 4–2 because of the new address now shown on the seven address lines out of Binary Counter 3–3.

The reason for setting the Binary Counter 3–3 to a one higher count than that shown in Counter 3–2 is that it is necessary to condition the gates in the Peg Scan Assemblies block 1–A so that they are prepared to transfer the next group of eight bits to the 8 Bit Storage Register 4–2 in the Data In and Memory Control block 4 as soon as examination of the presently stored eight bits has been completed. The three address lines out of the counter 3–1 and the seven bits out of Counter 3–2 are also routed to a 10 Bit Comparator 3–7 to be compared with the ten line read-out address which is presented during a data read-out operation, and which will be subsequently described.

Every time that the count in Binary Counter 3–1 equals 7, a T9 timing pulse is passed through gate 3–8 to set 8th Bit Flip-Flop 3–9 and generate a Peg Data Strobe signal PDS. Immediately thereafter at time T1, the 8 output from 8th Bit Flip-Flop 3–9 gates a T1 pulse through gate 3–10 and resets Peg Address Flip-Flop 3–11 and generates the Peg Address Strobe $\overline{PAS}$ signal. It is this $\overline{PAS}$ signal together with the seven address lines signals from Binary Counter 3–3 which gates the next eight data bits out of the Peg Scan Assemblies block 1–A and presents the data at the Data In and Memory Control input gates 4–3. However, this data is not gated through the input gates 4–3 until the Peg Data Strobe signal PDS is generated through gate 3–8 eight timing cycles (bit times) later by a T9 pulse after the eight bits presently in the 8 Bit Storage Register 4–2 have been examined. As shown on FIG. 10, the $\overline{PAS}$ signal shown as occurring during the bits (or lines) 0–7 time is really conditioning peg scan assembly lines 0–7 for data sampling by the PDS signal which is shown at T9 time of line 7 scan time during the bits 0–7 time. Accordingly, actual sampling of lines 0–7 takes place during the time interval beginning at the point designated "Start of Memory Location $\phi$ Time".

The T4 pulse resets the 8th Bit Flip-Flop 3–9 after the T1 pulse has reset the Peg Address Flip-Flop 3–11. The $\overline{PAS}$ signal is suppressed by a signal into the Set input of Peg Address Flip-Flop 3-11 from Binary Counter 3-1 when the next count of 2 in that binary counter occurs. The suppression of the $\overline{PAS}$ signal is not material at that point since the address from Binary Counter 3-3 had already been strobed into the Peg Scan Assemblies block 1-A and the address is stored, so that upon the occurrence of the next Peg Data Strobe signal PDS, the information bits on the selected address lines are gated into the 8 Bit Storage Register 4-2 through the input data gates 4-3. The $\overline{PAS}$ and PDS signals are shown in the just described timing relationship on the timing waveform diagram of FIG. 10.

PEG AND USAGE EVENT DETECTION — FIGS. 4,9,10,11,12,13,14,15

PEG EVENT COUNT (PEC) — FIGS. 4,9,10,11,13,14

When the Peg Data Strobe signal PDS was received from the Memory Address block 3, the data on the particular eight input lines designated by the then current address was gated through into the 8 Bit Storage Register 4-2 where it remains for eight bit times so that the eight bits can be sequentially examined one at a time through the Parallel-to-Serial Multiplexer 4-1, the particular bit being examined being determined by the state of the three address lines $\phi$, 1, 2 from the Memory Address block 3 as shown in FIG. 10. Activity on the particular line being examined is designated by a signal output F, and lack of activity on the line is designated by a signal output $\overline{F}$. These signals F and $\overline{F}$ are presented to the Peg Up and Down Integration Network 4-4 along with timing signals T3, T5, T6 and T7 from the Timing block 2, and with count information form 3 Bit Binary Counter 4-5 and Shift Register 4-6.

The occurrence of an event which will generate a Peg Event Count signal PEC is one in which a particular line is examined at periodic intervals and found to have a condition present or F signal for three successive looks, followed by the condition of the line in which there is a condition absent or $\overline{F}$ signal for three successive looks. When such a sequence of conditions has been determined to exist for a given line, a Peg Event Count signal PEC is generated for the line, and this count is added in the Memory 5 to the previous count stored in the Memory for that line.

The overall minimum length of time required to determine whether or not a peg event has occurred is controlled by the Peg-Up signal PU and the Peg-Down signal PD. These signals are generated by the 8 Bit Binary Counter and Decoder 4-7 which generates signals that are multiples of the 1024 bit revolution signal interval R which is generated in the Memory Address block 3 by Revolution Flip-Flop 3-5 and a T3 timing pulse. The R signal is generated once in each 1024 bit times, and the additional signals generated by the Binary Counter and Decoder 4-7 are successive multiples-of-two of the R signal, thus the signals available are in addition to the R signal, a signal appearing at an interval of 2R, at an interval of 4R, 8R and so on up to 256R intervals. The revolution signals R through 32R are shown on the timing waveform diagram of FIG. 11. The relative timing to the other timed signals is seen by comparing the R signals of FIGS. 9 and 11.

As shown in the Memory Address logic of FIG. 3 and on the timing waveform diagram of FIG. 9, the R signal which occurs once in every revolution, or 1024 bit times has a duration of one pulse time, occurring during the T3 pulse time of Bit $\phi$. The state of each line may be looked at once during each revolution, in which event the R signal will be used for peg-up and peg-down, or the state of each line may be looked at at some multiple of a single revolution as for example every fourth revolution, in which case the Peg-Up and Peg-Down signals selected would be the 4R signal. Moreover, it is possible to select a first interval during which the peg-up condition is examined and select a second interval during which the peg-down condition is examined, as for example examining the peg-up condition every second revolution and examining the peg-down condition every eighth revolution. The specific noise conditions on the lines being monitored will determine which intervals are selected for the peg-up and the peg-down time intervals.

The selected Peg-Up signal is applied to gate 4-9 to determine when the count data from Shift Register 4-6 is gated into the Integration Network 4-4 to determine the occurrence of the peg event count.

Assuming that a signal to the CLEAR input of 3 Bit Binary Counter 4-5 had just previously been generated by the integration Network 4-4 form a CL signal routed thereto as a consequence of a clear command received from a downstream computer, this CLEAR input signal is held for one complete revolution so that the output count of the 3 Bit Binary Counter 4-5 is cleared to zero, as is the count in all positions of the Shift Register 4-6. Reference back to the Timing generator logic of FIG. 2 shows that the Active Memory Flip-Flop 2-6 generates an active memory AM CLOCK signal which exists during the time interval from T1 to T2 for each bit time. This active memory AM CLOCK signal is a signal which synchronizes the Shift Register 4-6 of the Data-In and Memory Control block 4 with the Shift Registers 5-5 and 5-6 of the Memory shown in FIG. 5, thus insuring that peg event count data appearing as the PEC signal out of Integration Network 4–4 is added to the proper bit location in the active memory Shift Register 5-5.

Since everything has been cleared to zero in the Shift Register 4-6 and Binary Counter 4-5, the zero count out of the Shift Register 4-6 will be recirculated back through the Binary Counter 4-5 at T3 time by a T3 pulse and will again appear as the output count for recirculation back to the input of the Shift Register 4-6 unless an Increment BC signal has been generated by the Integration Network 4-4. The generation of an Increment BC input to the Binary Counter 4-5 steps the count up from zero to one, and, assuming that on the next two successive cycles an Increment BC output is also generated by the Integration Network 4-4, then the count out of the Binary Counter 4-5 will have risen to 3. If three successive F states or conditions are not detected, the count in the binary counter is set back to zero and the look is continued until three successive F states are detected.

The Increment BC signals are generated at T5 time, and after the output count of Binary Counter 4-5 has risen to 3, immediately thereafter at T6 time the Integration Network 4-4 will generate an Increment BC signal and an Increment A signal which will step the Binary Counter 4-5 output count to four. The shift of the count from the bianry counter from three to four disables the peg-up gate 4-8 to the integration network and enables the peg-down gate 4-9. Therefore, the Integration Network 4-4 for the next three counts is looking for three successive $\overline{F}$ states in order to generate a Peg Event Count signal PEC.

If three successive $\overline{F}$ states or conditions are not detected, the count in the binary counter is set back to four by Clear and Increment A signals, and the look is continued until three successive $\overline{F}$ states are detected. At this time, the Peg Event Count signal PEC is generated to increment the count in the corresponding memory location of the active memory Shift Register 5-5, and a CLEAR signal is generated which clears the count in Binary Counter 4-5 back to zero. Accordingly, with the output count from Binary Counter 4-5 now set at zero, the count in the Shift Register 4-6 at the corresponding line and memory location will also be zero in preparation for the next time that that location is examined. Specific logic for implementing the functions described hereinbefore for the Peg Up and Down Integration Network 4-4 and for the 8 Bit Binary Counter and Decoder 4-7 is shown respectively in FIGS. 13 and 14.

USAGE INTERVAL COUNT (UIC) — FIGS. 4,11,12,14,15

In addition to determining and recording the amount of activity on any given line in the manner just described by generating the Peg Event Count signals PEC and recording the same for each line in the Shift Register 4-6, it is also important to be able to determine what the average length of each event has been. The average length of each event is determinable when the total usage time and the number of events are known. The total usage interval is determined for each line by means of a selected one of the Usage Integration Networks 4-10 and 4-11, together with the 2 Bit Binary Counter 4-12, the Shift Register 4-13, and the gates associated therewith. The usage interval data is acquired during the same time that the peg event count information is being acquired for each particular line and is keyed to the F and $\overline{F}$ signals which indicate whether or not there is activity on the particular line then being examined.

The F signal from Multiplexer 4-1, in addition to being routed to the Up And Down Integration network 4-4, is also presented as an input to gate 4-14 while the $\overline{F}$ signal is routed as an input to gate 4-15. Additionally, gates 4-14 and 4-15 require a T5 timing signal and an HW signal from the A or B Usage Integration Networks 4-10 and 4-11. Assuming for the moment that there is no HW signal present on gates 4-14 and 4-15, these gates are inoperative and there can be no inputs to the 2 Bit Binary Counter 4-12 or Shift Register 4-13. Consequently, gate 4-16 is inhibited and gate 4-17 is enabled so that the contents of the Shift Register 4-13 can be continuously recirculated through the register under control of the active memory AM CLOCK signal. Additionally, as will be subsequently shown, the Shift Register 4-13 has been cleared to zero in every bit position so that the external recirculation loop of the Count-Out output of the Shift Register 4-13 which recirculates back to the Pre-set Count input of 2 Bit Binary Counter 4-12 will be circulating zero counts back to the Pre-set Count input.

Figure 12:
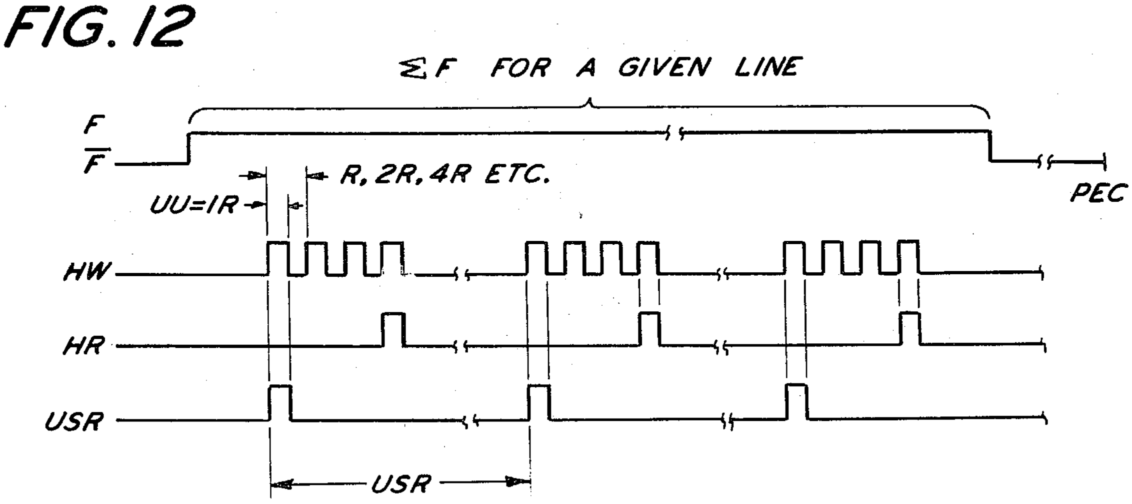
FIGS. 9 through 12 are timing waveforms diagrams showing the important timing waveforms present within the apparatus according to the invention, the different figures being scaled to different time bases but correlated with one another by common waveforms.

Referring now also to FIG. 12, assume now that an HW signal is generated by one of the usage integration networks and that the particular line being examined is in an active state so that an F signal is also present. Under these conditions, at the occurrence of the next T5 timing pulse, a signal will be gated through gate 4-14 and increment the count in the 2 Bit Binary Counter 4-12 so that the Count-Out of the 2 Bit Binary Counter will be a "one" count. With the HW signal present, gate 4-17 is inhibited which stops the recirculation of the Shift Register 4-13 and enables gate 4-16 so that the occurrence of the next AM CLOCK pulse gates the "one" so that the occurrence of the next AM CLOCK pulse gates the "one" count out of the 2 Bit Binary Counter 4-12 into the proper line position of the Shift Register 4-13. Each successive line of the next 1023 lines will be similarly examined, and the count for each of those lines will be incremented or not as a function of whether or not there is activity on that particular line at the time it is examined.

Assuming now that the first line which was examined has been stepped down through the Shift Register 4-13 to the output position and is circulated around to the Pre-set Count input of the 2 Bit Binary Counter 4-12 because one complete revolution has been completed and the Multiplexer 4-1 is now about to again examine the condition of that line, the initial "one" count which had been established on the previous revolution is now set into the Count-Out position of the 2 Bit Binary Counter by the Pre-set Count input at time T3 by a T3 timing pulse. Two pulse times later at T5 when this line is again examined for the presence of activity thereon, and assuming that there is such activity so that the F signal is again present on gate 4-14, another Increment Count input will be received by the 2 Bit Binary Counter 4-12 which will step the Count-Out to a "two" count. This "two" count is now, as previously explained, inserted into that line position of the Shift Register 4-13 and proceeds to step down through the register as a "two" count. Again the remainder of the lines are sequentially examined until this same line which has now been established as having a "two" count on it again is circulated back into the Pre-set Count input of the 2 Bit Binary Counter 4-12 and appears in the Count-Out position.

Again assuming that activity is present on that line, a signal will be for the third time passed through gate 4–to the Increment Count input of the 2 Bit Binary Counter 4-12 and step the Count-Out to a "three" count. The "three" count alos enables gate 4-18 so that one pulse time later at T6 a Usage Interval Count signal UIC is passed through the gate for transmission to and storage in the Memory location corresponding to that line, as will be subsequently described. Additionally, the UIC signal is transmitted to "or" gate 4-19 through which it passes to the CLEAR input of 2 Bit Binary Counter 4-12 and clears the count to zero for that particular line position. This zero count for that line position appears at the Count-Out output of the 2 Bit Binary Counter, and when thereafter at the next T1 time the active memory AM CLOCK signal appears, this zero count is placed in that line position of the Shift Register 4-13.

The HW signal is present for three complete revolutions, which may be consecutive or which may be spaced from one another by intervals as determined by the Usage Up signal UU. Accordingly, these revolutions during which data examination occurs, may be spaced at intervals of 1R, 2R, 4R, 8R and so forth. The HW signal remains for one additional revolution time, but during this additional revolution time the HR signal has also been generated and is present so that irrespective of whether or not any data were being gated through gate 4-14 to the Increment Count input of 2 Bit Binary Counter 4-12, the presence of the HR signal which is passed through "or" gate 4-19 to the Clear Input of 2 Bit Binary Counter 4-12 jams the output count of the counter to zero for one entire revolution of 1024 bits, so that the Shift Register 4-13 now contains zero counts in all line positions, and the Binary Counter 3-12 is also cleared to zero.

From the foregoing, it will be understood that a UIC signal was generated for each line position in which a count of three was obtained during the sampling time, and that no UIC signal was generated for any line position in which less than a count of three was obtained during the sampling time. The three count sampling system is utilized as for the peg event count to insure as closely as possible that a true event is being detected instead of noise.

The interval between HW signal groups, and the length of the entire HW signal is selectably variable. The USR or usage scan rate signal determines the length of time between the occurrence of HW signal groups and is shown on the Timing generator outputs as selectable at one second, 3.6 seconds, 10 seconds, 36 seconds or 100 seconds. The total usage time for a given line is therefore the usage scan rate in seconds multiplied by the number of UIC signals recorded for that line. The average usage time per event is obtained bv dividing the total usage time by the number of PEC signals recorded for that line. Having selected the interval of usage scan, the length of time over which the three samplings takes place is determined by the usage-up or UU signal from the 8 Bit Binary Counter and Decoder 4-7. The three samples may be taken on three consecutive revolutions or may be spaced apart depending upon which particular UU signal is selected. These timing relationships are shown in the waveforms of FIG. 12.

Two usage integration networks 4-10 and 4-11 are illustrated, with the B Usage Integration Network 4-11 actually being shown as connected to the illustrated circuitry for control of the number 1 memory group in the terminal. Each of the other nine memory groups of the terminal is similarly connected to either the A or the B usage integration networks so that different memory groups within the terminal may be utilizing different usage scanning rates and/or different usage up intervals. Specific logic for implementing the functions described hereinbefore for the Usage Integration Networks 4-10 and 4-11, is shown in FIG. 15.

PEG AND USAGE DATA STORAGE — FIG. 5

The PEC and the UIC signals which have just been generated from the Data In and Memory Control block 4 are routed to the Memory block 5 where these signals are directed to the particular memory group which stores the data for the 1024 lines associated with the Peg Scan Assembly rack for which the PEC and UIC signals have been generated. This memory group is one of up to ten groups contained in a particular terminal, each of the other nine memory groups being supplied with their own PEC and UIC signals for their associated Peg Scan Assembly sub rack. One of the ten identical memory groups is shown in FIG. 5 to which attention should now be directed.

DIAGRAM 1

MEMORY GROUP 12 x 1024 BITS SHIFT REGISTER

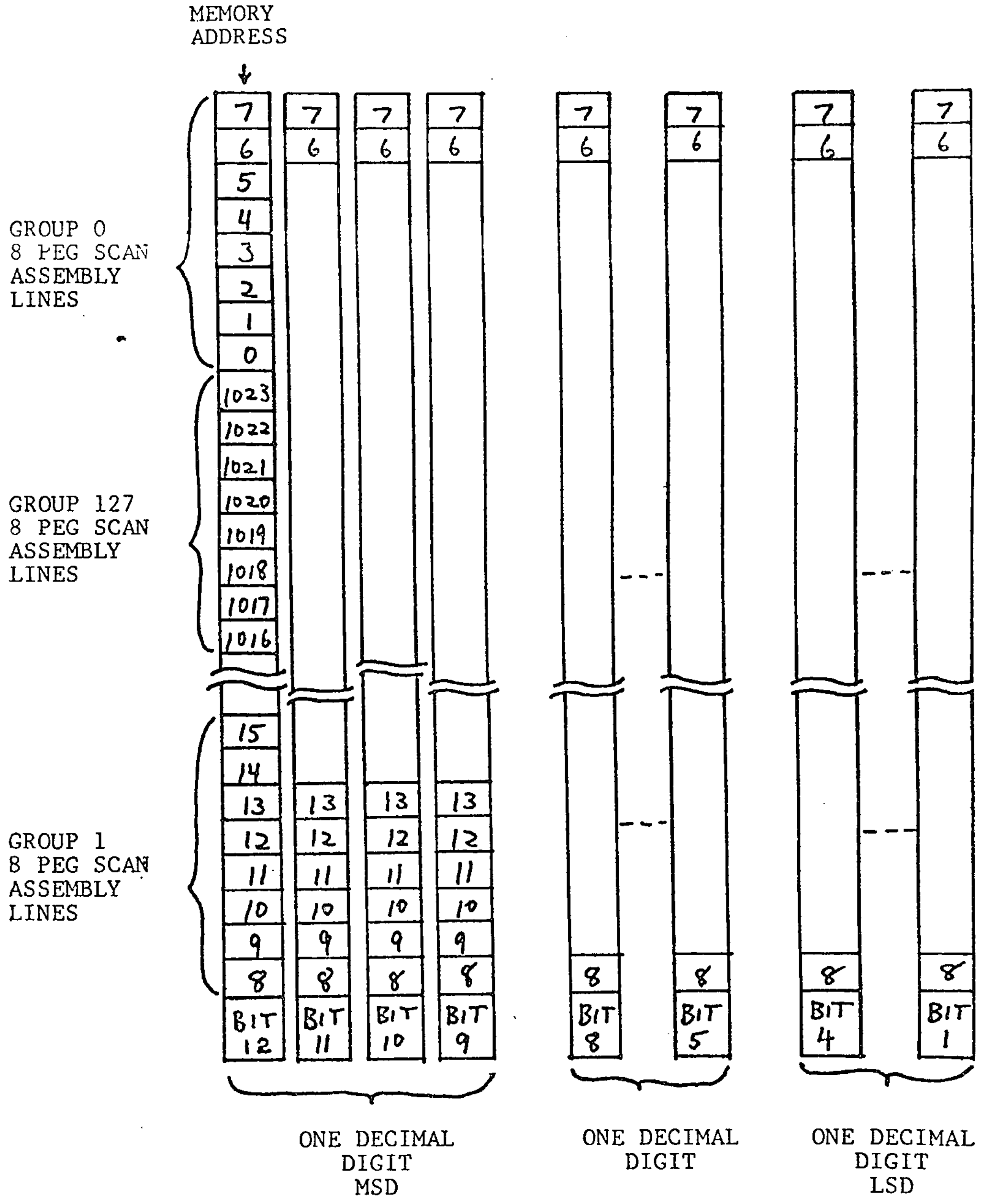

The peg event counts and the usage interval counts are each respectively routed to 12 Bit Decade Counters 5-1 annd 5-2 via gates 5-3 and 5-4. The 12 Bit Decade Counters have a count capability of 999 for each line monitored, the maximum count of 999 representing the maximum count achievable with three decimal digit positions. Each decimal digit requires four binary bits to reach a count of nine so that the three decimal digits require a twelve bit counter. The output count of each of the 12 Bit Decade Counters 5-1 and 5-2 is fed to the Count-In input of the Shift Registers 5-5 and 5-6. A diagram of the shfit registers is shown in DIAGRAM 1 from which the 12 bit/3 decimal digit/1024 memory locations structure is apparent. The Count-Out output of each of the Shift Registers is externally circulated back to the Pre-set Count input of the associated Decade Counter 5-1 or 5-2, with the particular count being gated into the counter by a T3 timing signal. This continuous external recirculation goes on unless a PEC or a UIC signal appears, in which event such signals are passed through the respective gates 5-3 or 5-4 to the Increment Count input of the decade counters where the increment is added to the pre-set count and appears at the Count-Out output of the decade counters, and accordingly is inserted into the appropriate memory line location of the associated shift register.

The circulation of the bit information is at the rate determined by the active memory AM CLOCK signal, which is of course the same signal which provides the bit shifting through the shift registers of the Data In and Memory Control block 4 so that all of these registers are synchronized and the data for a given line which generates a PEC or UIC signal is always added into the proper line location in the memory group Shift Register 5-5 or 5-6. When the count in either of the Shift Registers 5-5 or 5-6 reaches its maximum of 999, an output signal is generated which inhibits the PEC input gate 5-3 or the UIC input gate 5-4. If this were not done, an additional count would step the data for that particular line position back to zero and the information data would be lost.

These memories may be cleared by a CLEAR-ALL signal generated in response to a TURN-ALL command from a supervising computer, the CLEAR-ALL signal causing all memory groups of the entire terminal to be cleared. Additionally, individual clear signals may also be generated in response to a TURN-PAGE command received from a downstream or supervising computer, the TURN-PAGE signal causing the accumulating or active memory just described to transfer its contents to a passive memory, followed by a clearing of the active memory. The memory group illustrated in FIG. 5 is memory group 1 associated with the Data-In and Memory Control block logic previously described, and accordingly, the selective clearing signal for this memory group is shown as a CLEAR 1 signal. Other memory groups will be selectively cleared by clear signals specific to that group such as a CLEAR $\phi$ or a CLEAR 9 signal.

EXTERNALLY CONTROLLED FUNCTIONS — FIGS. 3 to 8

The foregoing description illustrates the manner in which information is taken from a large group of lines which are scanned to determine whether or not there is activity on those lines and what the duration of such activity is. This section is concerned with the manner in which the data which has been stored in the memory groups is controlled by a suitable downstream computer so that the memory data may be read out of the terminal and transmitted elsewhere for evaluation. Additionally, by means of command from a downstream computer, the entire terminal may be initialized to clear all the memories and insure that all of the internally timed components of the terminal are operating synchronously. Moreover, certain internal data transfers can be carried out within the memories of the terminal even though the data is not at that time being read out of the terminal for use elsewhere.

CLEAR ALL MEMORIES — FIGS. 6, 5, 4

Referring now to the overall block diagram of FIG. 1 and to the Memory Transfer block shown in FIG. 6, it is observed that upon receipt from the controlling computer of a command to initalize the entire terminal, a signal is generated by the Input Command Decode and Control block 1-B which is routed to the Memory Transfer block 6 as a CLEAR signal.

The CLEAR signal sets the Clear Strobe Flip-Flop 6-1 to generate a CS signal which is applied as one input to gate 6-2, the other input to which being the R signal generated in the Memory Address block in a manner previously described. The R signal exists for one pulse time at time T3 and strobes the CS signal through gate 6-2 to set the Clear Level Flip-Flop 6-3 and generate the CL signal. The CL signal is routed to the Data In and Memory Control block 4 where it clears 8 Bit Storage Register 4-2, clears the 8 Bit Binary Counter and Decoder 4-7, clears the A and B Usage Integration Networks 4-10 and 4-11, and is routed to the Peg Up and Down Integration Network 4-4 which generates a signal input to the CLEAR input of 3 Bit Binary Counter 4-5, clearing the latter and also Shift Register 4-6.

This same CL signal appears on gate 6-4 where it is gated through at T4 time for the next 1024 T4 times to accordingly generate 1024 CLEAR ALL signals. These CLEAR ALL signals are routed to the CLEAR ALL input points of the 12 Bit Peg Decade Counter and the 12 Bit Usage Decade Counter in the Memory block 5 for all ten memory groups. Accordingly, all 1024 memory locations in the Shift Registers 5-5 and 5-6, as well as their corresponding counterparts in the other memory groups are cleared to zero. The CL signal remains up for 1024 bit times because the R signal which permitted the Clear Level Flip-Flop 6-3 to be set is not received again until 1024 bit times later. At that time it enables gate 6-5 to pass through a $\overline{CS}$ signal from the Clear Strobe Flip-Flop 6-1 to reset the Clear Level Flip-Flop 6-3 and terminate the CL signal. The $\overline{CS}$ signal was generated at the first T$\phi$ pulse time after the C signal was generated by routing the CL signal up to gate 6-6, the reset input of Clear Strobe Flip-Flop 6-1, where the next T$\phi$ signal gate through to the reset input.

TRANSFER ALL MEMORIES — FIGS. 6, 5

The TURN ALL command is one which is received from the supervising downstream source and causes all of the active memory registers, both peg and usage, to transfer their contents to an associated passive memory register for passive storage, and causes all of the active memories to be cleared. Upon receipt of a TURN ALL command by the Input Command Decode and Control block 1-B, a TA signal is generated which is routed to the Memory Transfer block 6. At the Memory Trannsfer block, the TA signal sets the TA Strobe Flip-Flop 6-7 thereby generating an ST signal which is applied to gate 6-8. When the next revolution signal R appears, it gates the ST signal through to set the TA level Flip-Flop 6-9 and generates an L signal. The L signal is circulated back to gate 6-10 where the next Tφ timing pulse gates it through to reset the TA Strobe Flip-Flop 6-7. Upon reset, the ST signal on gate 6-8 disappears and the $\overline{ST}$ signal arises on gate 6-11. One revolution later when the R signal again appears it gates the $\overline{ST}$ signal through gate 6-11 to reset the TA Level Flip-Flop 6-9. Accordingly, the L signal is present for one revolution or 1024 bit times.

The L signal passes through "or" gate 6-12 and a group of ten "or" gates 6-13 through 6-22 to enable "and" gate 6-23 and the group of ten "and" gates 6-24 through 6-33. The enable signals on the group of ten gates 6-24 through 6-33 are designated as the TMφ signals through the TM9 signnal which represent "transfer memory φ" signal through "transfer memory 9" signal, these signals being routed to the Memory block 5. As shown in FIG. 5 which illustrates memory group 1, the transfer memory 1 or TM1 signal applied as an inhibit to gates 5-7 and 5-8, and is applied as an enabling signal to gates 5-9 and 5-10. The gates 5-7 and 5-8 are the normal internal recirculation gates for the Passive Peg Shift Register 5-11 and the Passive Usage Shift Register 5-12, recirculation through the registers being clocked by the passive memory PM CLOCK signals which are also applied to all four gates 5-7 through 5-10.

During the normal recirculation there can be no transfer of information from the Shift Registers 5-5 and 5-6 to the Shift Registers 5-11 and 5-12 because the input gates to the later are closed in the absence of a TM1 signal. When the TM1 signal is generated, gates 5-9 and 5-10 are enabled thereby permitting the contents respectively to Shift Registers 5-5 and 5-6 to be stepped into the Shift Registers 5-11 and 5-12 by the successive passive memory PM CLOCK signals. During this time, the recirculation gates 5-7 and 5-8 have been disabled by the TM1 signal so that no recirculation can occur. The transfer memory signals arise at T3 time, and immediately thereafter at T4 time a first timing pulse is gated through gate 6-23 by the enabling L signal thereon to generate CLEAR φ through CLEAR 9 signals out of gates 6-24 through 6-33. 1024 such clearing signals will be generated by the T4 timing pulses during the interval corresponding to the one revolution during which the L signal remains present.

The CLEAR 1 signal from gate 6-25 is routed to the Memory block 5 where it is applied to the 12 Bit Peg and Usage Decade Counters 5-1 and 5-2 to clear the count to zero for each line location, resulting in a total clearing of these registers after one revolution time. As previously mentioned, when the next R signal is generated, the TA Level Flip-Flop 6-9 is reset so that the L signal disappears and thereby terminates the transfer memory signals and the clear signals by disabling the gates 6-23 through 6-33.

The system is so set up that during the transfer memory operation, the information in each line location of the Shift Register 5-5 and 5-6 is transferred to the Shift Registers 5-11 and 5-12 respectively before the information in the corresponding line locations of the Decade Counters 5-1 and 5-2 is transferred therefrom to the active Shift Registers 5-5 and 5-6. This is accomplished by having the passive memory PM CLOCK signal occur one pulse time sooner than the active memory AM CLOCK signal. The mechanics are carried out in the following manner.

At time T3 the count for a particular line location then at the output of Shift Register 5-5 and 5-6 is circulated back to the Decade Counters 5-1 and 5-2 and inserted therein by a T3 pulse at the Pre-set Count input to the counters. The CLEAR 1 signals occurs during the immediately following pulse time T4 and clears out the pre-set count which had just been set in. Two pulse times later at T6, if there had been any activity on the peg event count or usage interval count lines, this data is gated into the now cleared line location and appears as new data for that line location at the output of the Decade Counters 5-1 and 5-2. This count is now shifted into the Shift Registers 5-5 and/or 5-6 by the next active memory AM CLOCK pulse. Thus, new data can be accumulated during a memory transfer.

MEMORY GROUP IDENTIFICATION — FIG. 7

Every incoming command to the Input Command Decode and Control block 1-B contains among other things a group identity character and a command character. The group identity character determines which memory group is to be utilized in conjunction with the particular command received. The command character specifies the nature of the activity which is to be taken. Tje flexibility of the system may be illustrated as follows. Assume that a terminal at a particular location has a capability of containing up to ten memory groups, and further, that the group identity characters are capable of identifying substantially more than the ten memory groups which may be contained in one terminal, as by way of illustration perhaps being capable of identifying thirty-two separate memory groups. Since the particular terminal has a maximum memory group capability of only ten such groups, it follows that a multiple number of terminals may all be controlled and interrogated and commanded by the command source, and that this plurality of terminals may be physically located at different locations.

For example, one such system might involve four terminals at four different locations each having eight memory groups in a terminal. Alternatively, six terminals might be utilized at six different locations, provided that the total number of memory groups in the six terminals does not exceed thirty-two memory groups. Means are provided within each terminal to determine whether or not the particular memory group which is being addressed in the command is in fact located in that terminal. The process of so identifying whether or not the particular memory group being sought is in a given terminal will now be described in conjunction with an examination of FIG. 7.

The group identity character generates from the Input Command Decode and Control block 1-B the two signals ID and IDR which are routed to the Memory Identity block 7. The ID signal contains five bits having a capability of identifying thirty-two separate codes each of which corresponds to one memory group. Referring for the moment to Table 1 it will be observed that the thirty-two separate memory groups are each identified by a particular identifier, and each such identifier is characterized by an eight bit pattern, the five least significant bits of which, bits 1 to 5, are shown as being the ID signal. Bits 6 and 7 identify which four fields of the standard ASCII code is being designated. As shown, field three is the designated field, the other fields being designated as 00, 01 and 11. Bit 8 is an odd/even check bit. Referring to FIG. 7 it will be seen that the 5 Bit Digital Multiplexer 7-1 has the ID bit pattern shown in Table 1 set therein for decoding the A and B memory groups, but it should be appreciated that if this particular terminal contained ten memory groups, that the multiplexer 7-1 would represent only one of five such devices so that a total memory group identification of ten would be available for the terminal.

TABLE 1

| MEMORY GROUP IDENTIFIER | BIT PATTERN | | | | | | | |
|---|---|---|---|---|---|---|---|---|
| | CHECK | FIELD | | ID | | | | |
| | 8 | 7 | 6 | 5 | 4 | 3 | 2 | 1 |
| @ | 1 | 1 | 0 | 0 | 0 | 0 | 0 | 0 |
| A | 0 | 1 | 0 | 0 | 0 | 0 | 0 | 1 |
| B ← | 0 | 1 | 0 | 0 | 0 | 0 | 1 | 0 |
| C | 1 | 1 | 0 | 0 | 0 | 0 | 1 | 1 |
| D | 0 | 1 | 0 | 0 | 0 | 1 | 0 | 0 |
| E | 1 | 1 | 0 | 0 | 0 | 1 | 0 | 1 |
| F | 1 | 1 | 0 | 0 | 0 | 1 | 1 | 0 |
| G | 0 | 1 | 0 | 0 | 0 | 1 | 1 | 1 |
| H | 0 | 1 | 0 | 0 | 1 | 0 | 0 | 0 |
| I | 1 | 1 | 0 | 0 | 1 | 0 | 0 | 1 |
| J | 1 | 1 | 0 | 0 | 1 | 0 | 1 | 0 |
| K | 0 | 1 | 0 | 0 | 1 | 0 | 1 | 1 |
| L | 1 | 1 | 0 | 0 | 1 | 1 | 0 | 0 |
| M | 0 | 1 | 0 | 0 | 1 | 1 | 0 | 1 |
| N | 0 | 1 | 0 | 0 | 1 | 1 | 1 | 0 |
| O | 1 | 1 | 0 | 0 | 1 | 1 | 1 | 1 |
| P | 0 | 1 | 0 | 1 | 0 | 0 | 0 | 0 |
| Q | 1 | 1 | 0 | 1 | 0 | 0 | 0 | 1 |
| R | 1 | 1 | 0 | 1 | 0 | 0 | 1 | 0 |
| S | 0 | 1 | 0 | 1 | 0 | 0 | 1 | 1 |
| T | 1 | 1 | 0 | 1 | 0 | 1 | 0 | 0 |
| U | 0 | 1 | 0 | 1 | 0 | 1 | 0 | 1 |
| V | 0 | 1 | 0 | 1 | 0 | 1 | 1 | 0 |
| W | 1 | 1 | 0 | 1 | 0 | 1 | 1 | 1 |
| X | 1 | 1 | 0 | 1 | 1 | 0 | 0 | 0 |
| Y | 0 | 1 | 0 | 1 | 1 | 0 | 0 | 1 |
| Z | 0 | 1 | 0 | 1 | 1 | 0 | 1 | 0 |
| [ | 1 | 1 | 0 | 1 | 1 | 0 | 1 | 1 |
| \ | 0 | 1 | 0 | 1 | 1 | 1 | 0 | 0 |
| ] | 1 | 1 | 0 | 1 | 1 | 1 | 0 | 1 |
| ∧ | 1 | 1 | 0 | 1 | 1 | 1 | 1 | 0 |
| — | 0 | 1 | 0 | 1 | 1 | 1 | 1 | 1 |

In this regard, it will be observed that the BCD to Decimal Decoder 7-2 illustrates a decoding situation where a decoded $\phi$ corresponds to memory group A identification, whereas a decoded 1 corresponds to a B memory group identification. The other decoded numbers 2 to 9 would of course correspond to other memory group identifiers for other memories in the terminal. Assume now that the five bit ID memory identification character has been set into one output of the Comparater 7-3 where it is stored for comparison with five bits which will be presented at the other input of the Comparater 7-3 in order to determine whether or not a match occurs.

The IDR signal, meaning IDentification Received, sets the IDR Flip-Flop 7-4 to its M state and also clears 4 Bit Binary Counter 7-5. The M signal sets a level on gate 7-6 and also on gate 7-7. When the IDR signal cleared 4 Bit Binary Counter 7-5 it set a zero count into the Count BCD Out output of the counter, which sets a zero count at the Count In input of the BCD to Decimal Decoder 7-2, thereby generating an A memory group enabling signal so that the five bit code 00001 corresponding to the A memory group appears at the output of the 5 Bit Digital Multiplexer in the F$\phi$ through F4 bit positions. This bit group appears at the gate 7-7, and a T5 time, which is one pulse after the IDR signal, the five bit group from the output of the Multiplexer 7-1 is gated through the input of 5 Bit Storage Register 7-8. The output of this register is routed to the comparison input of the Comparator 7-3 to see whether or not these five bits correspond to the five bit ID code which has been previously set into the comparator. Assuming that the five bits of the ID signal are in fact the five bits corresponding to B memory group identification, it will be clear that the five bit identification of the B memory group will not provide a comparison with the five bit group which identifies the A memory group. Accordingly, no signal will be generated at the C output of Comparator 7-3.

At T1 time following the T5 time which caused the multiplexer five bit output code to be inserted into the Storage Register 7-8, a T1 pulse will be gated through gate 7-6 to the Count In input of Binary Counter 7-5 because of the continued presence on the gate of an enabling M signal. The T1 pulse causes the binary counter to advance its count at the Count BCD Out output from "zero" to "one", and this "one" count is inserted into the Count In input of the BCD to Decimal Decoder 7-2 to thereby step the output count from "zero" to "one". This suppresses the A enable condition and causes the B enable condition to arise so that the five bit code corresponding to the B memory group, namely 00010, appears at the multiplexer five bit output. When the next T5 timing pulse occurs four pulse times after the T1 pulse, the five bit storage group identifying memory group B is gated through to the input of Storage Register 7-8 and is transmitted therethrough to the output and then to the input Comparator 7-3 for comparison with the five bit ID code which has initially been set in.

Since the five bit ID code in fact is exactly the B memory group code group, a comparison is made and a C signal is generated by the comparator which passes through "or" gate 7-9 to reset IDR Flip-Flop 7-4 and suppress the M signal. With the M signal suppressed, no successive T1 pulses will be enabled to pass through gate 7-6 so that the Count BCD Out condition of Binary Counter 7-5 now remains static at a count of "one". The count at the output of Binary Counter 7-5, identified as the MID signal, thus uniquely identifies the selected memory group as memory group 1. It should be noted that the count in the Binary Counter 7-5 will remain in a static state until some time in the future when a new IDR signal is received to again clear it back to zero.

It should be observed that the MID signal, or the output of Binary Counter 7-5, is also routed to the input of a 4 Bit Comparator 7-10 for comparison with a number stored in the comparator. The number stored in the comparator corresponds to the number of memory groups present in the terminal. As shown in FIG. 7 the illustrative terminal is shown to contain seven memory groups represented by the binary coded count of six shown in Comparator 7-10. The binary coded number six represents seven groups since one group is represented by a condition of four zeros. The IDR signal occurs at T4 so that when it clears the Binary Counter 7-5 to a zero BCD Out count, this zero count is presented to the 4 Bit Comparator 7-10 in sufficient time so that a comparison can be made against the stored count in the Comparator 7-10. Accordingly, a zero count can in fact designate one of the memory groups in the terminal.

Assuming that the memory group being actually searched for were not one of the memory groups in the terminal being considered, then after the Binary Counter 7-5 had counted up to six, thus representing the condition where a futher count would be in excess of the number of memory groups actually contained in the terminal, the six count out of Binary Counter 7-5 would provide a comparison with the previously set-in count in comparator 7-10 and a C1 signal would be generated to reset IDR Flip-Flop 7-4 and terminate the search for a memory group identification. Comparator 7-10 is obviously necessary to generate a C1 signal, because in the circumstance just illustrated Comparator 7-3 would never be able to generate a C signal, and without the generation of the C1 signal the counting cycle would not be brought to a termination.

Finally, it will be observed that an SID signal appears at the output of 5 Bit Storage Register 7-8, this signal really being a five bit code which is in fact the memory group identification code that appeared at the output of the Multiplexer 7-1 and remains statically set therein due to the termination of the counting sequence of Binary Counter 7-5 when identification was obtained. This SID signal, or Stored IDentification, is utilized in the data read out sequence and will be subsequently described.

SELECTIVE MEMORY TRANSFER — FIGS. 6, 5

As previously described, a received command contains among other things the memory group identification character and the command character. The memory group identification character has in the manner just described caused the generation of the MID signal. This MID signal is utilized in conjunction with command characters to cause the selected command to be executed. Two types of command will hereinafter be described, the first of which is known as a TURN PAGE or Selection Memory Transfer Command, and attention should be now again directed to FIG. 6. The TURN PAGE or selective memory transfer is very similar to the process carried out when all of the memories were transferred and cleared, the difference being in this case that only a particular selected memory will be caused to have its contents transferred from active memory to passive mempory and be cleared in accordance with the identification of that memory by the MID signal.

The command character which causes the selective memory transfer to take place generates the TP signal from the Input Command Decoder and Control block, this signal along with the just generated MID signal both being routed to the Memory Transfer block 6. The TP signal sets TP Strobe Flip-Flop 6-34 to generate an STP signal which enables gate 6-35 so that the next revolution signal R may pass therethrough to set TP Level Flip-Flop 6-36 and generate an E signal at its output. The E signal is routed to TP Strobe Flip-Flop 6-34 input gate 6-37 so that the next Tφ timing pulse will reset the Flip-Flop and generate and $\overline{STP}$ signal which enables gate 6-38 so that one revolution or 1024 bit times later, the next R signal will gate through and reset TP Level Flip-Flop 6-36 and suppress the E signal while generating the $\overline{E}$ signal, which latter is used in a manner to be subsequently described.

The appearance of the E signal from Level Flip-Flop 6-36 also enabled gate 6-39 so that the four bit MID code may be passed through the input of 4 Bit Digital Multiplexer 6-40. The four bit MID memory group identification code appears at the output of the multiplexer on the Fφ through F3 lines which are themselves connected to the input of BCD to Decimal Decoder 6-41. The four bit MID signal, as previously noted, identified memory group 1 so that the "one" output 6-41 appears, passes through "or" gate 6-14 to enable CLEAR 1 gate 6-25 and appear as the TM1 signal. The TM1 signal is transmitted to memory gates 5-7 through 5-10 and causes a transfer of the contents of the active peg and usage memories to the passive peg and usage memories in the manner which has previously been described.

Additionally, the presence of the E signal from Level Flip-Flip 6-36 appears on "and" gate 6-23, and at T4 time a timing pulse is passed therethrough to gate 6-25 which has been enabled by the Decimal Decoder 6-41 so that a CLEAR 1 signal is generated. Since the E signal from Flip-Flop 6-36 remains present on gate 6-23 for one complete revolution or 1024 T4 timing pulses will be passed therethrough to generate 1024 CLEAR 1 signals, so that the memory group 1 active memory registers may be cleared in all line locations.

When the E signal from Level Flip-Flop 6-36 is suppressed and the $\overline{E}$ signal arises, the latter signal enables gate G24 to thereby permit the JAM 4 LINES signal to pass therethrough to the 4 Bit Digital Multiplexer input designated as JAM>9. This jamming input causes the output code F3 to assume a count in excess of nine so that such a count cannot be decoded by the BCD to Decimal Decoder 6-41, and therefore none of the 0 to 9 output lines are enabled. Consequently, none of the TMφ through TM 9 signals are generated and all the gates 6-24 through 6-33 are disabled so that no CLEAR 9 signals can be generated. This terminates the selective memory transfer operation.

SELECTIVE MEMORY READ OUT — FIGS. 8, 5, 3, 16

Up to now, the description of the invention has been confined to the manner in which data is brought into the apparatus from the various sources being monitored, and the manner in which certain internal transfers of data are effected within the apparatus under command from a supervising source such as a downstream computer. The remaining section is concerned with the manner in which the data stored in the memory groups of the apparatus may be selectively read out of the apparatus under command of the supervising source.

It will be recalled from the description of the Memory block 5 that each memory group stores designated as peg event count data PEG and data designated as usage interval count data UIC, the usage interval count data providing the total time duration of the number of events which have occured and are stored in the corresponding line location of the PEG memory, which, by way of illustration may be the same thing as events which have occured on a particular communication line of a telephone system. It has also been shown that each memory group has an active memory for peg event count data and an active memory for usage interval count data into which memories data is accumulating on a current basis. Additionally, it will be recalled that each of these memory groups has a passive peg event count memory and a passive usage interval count memory into which the information of the active memories is transferred and held while additional information is thereafter accumulated in the active memories.

It may be desired to read out of the memory group the information stored in the active peg and usage memories or the information stored in the passive peg and usage memories. The selection between active and passive requires two different commands, and since there may be ten memory groups within the terminal, it is also necessary to specify which of the memory groups is to be read out of. Accordingly, twenty different memory read-outs may be desired and are capable of being carried out upon selected command.

As has been previously described in connection with the description of FIG. 7, the particular memory group which it is desired to read out of is specified by the generation of the MID signal, so that it only remains to determine within that memory group whether it is the acitve memory which is to read out or the passive memory. This selection is contained in the incoming command character and is decoded by the Input Command Decode and Control block 1-B which generates either the ARO or the PRO signal which is routed to the Read Out Sequencer block 8. The specific manner in which the selected active or passive memory group memories are read out of will be best understood by referring now to FIG. 8 showing the logic of the Read Out Sequencer, together with FIG. 2 showing the Memory block logic.

Referring first to the Read Out Sequencer shown in FIG. 8, assume that the MID and SID signals have been generated by the Memory Identity block 7 as previously described, and the supervising source has commanded the read out of the passive memories from Memory group B corresponding to terminal memory group 1. The passive read out command has caused the PRO signal to be generated which is transmitted via "or" gate 8-1 to "and" gate 8-2, "and" gate 8-3 and "or" gate 8-4. Additionally, this PRO signal sets PRO Flip-Flop 8-5 to generate the P signal which enables "and" gates 8-6 and 8-7.

With gate 8-2 enabled, the four bit MID signal is gated through to the input of 4 Bit Storage Register 8-8 and consequently is routed to the input of the BCD to Decimal Decoder 8-9 where the decoded memory group B signal, corresponding to memory group 1 of the terminal, causes the 1 output of the Decoder 8-9 to be generated and puts an enabling signal on gates 8-10 through 8-13. Since gates 8-6 and 8-7 have been enabled by the P signal, at such time as a signal is passed through either of these gates, such a signal will be transmitted to the corresponding gates 8-12 or 8-13 so that a PUE1 or a PEE1 signal will be generated.

Gates 8-10 and 8-11 will not pass signals through because they are only capable of doing this in the presence of an ARO command signal which is not at this time present. The ARO signal, if present, would have set ARO Flip-Flop 8-14 to generate the A signal which would have enabled gates 8-15 and 8-16 instead of gates 8-6 and 8-7. Gate 8-6 controls read out of the passive usage memory and accordingly has one of its inputs connected to the output of usage gate 8-17 which has its inputs connected to selected outputs of the BCD to Decimal Decoder 8-18, whereas gate 8-7 which controls read out of the passive peg memory data has its input connected to peg gate 8-19 which receives inputs from other selected outputs of the Decimal Decoder 8-18.

The SID signal from Memory Identity block 7 is the 5 Bit code which identifies the memory from which the read-out is to take place as the B or memory group 1 memory of the terminal. This 5 bit signal is gated through gate 8-3 by the PRO signal and is stored in 5 Bit Storage Register 8-20 where it appears at the output and consequently at gate 8-21. The PRO signal also passed through "or" gate 8-4 to the Count-in input of 3 Bit Binary Counter 8-22 where it shifts the Count-out from zero to "one". The "one" count from Binary Counter 8-22 enables gate 8-23 so that the next T7 timing pulse is gated through to gate 8-21 and causes the stored SID signal to be passed through gate 8-21 as the BID signal which is routed to the Output Data Encode and Control block 1-C, stored in the output buffer, and transmitted out as a data character at the selected baud rate. The "one" count out of Binary Counter 8-22 also enables "and" gate 8-24 so that the next T9 pulse is passed therethrough, through gate 8-4 to the count input of Binary Counter 8-22 where it steps the count to a "two" count. The "two" count signal is transmitted to "and" gate 8-25 where it acts as one of three necessary enabling signals, all of which are required to be present to permit a T3 timing pulse to be passed therethrough to the Count-in input of BCD Counter 8-26.

The BE signal shown on gate 8-25 is a "buffer empty" signal and is sent to the Read Out Sequencer from the Output Data Encode and Control block 1-C whenever the output buffer is empty and is in a condition to receive additional data. Assuming that the output buffer is empty, the BE signal will be present on gate 8-25 so that the "two" count signal from Binary Counter 8-22 appeared, it only remains for the appearance of the RAC signals to fully condition gate 8-25. Referring back to the Memory Address block detailed logic diagram of FIG. 3, it will be recalled that the 10 Bit Comparator 3-7 is shown as comparing the three address lines and seven address lines generated by the counters 3-1 and 3-2 with the input to the comparator designated as READ OUT ADDRESS 10 LINES. The three address and seven address input lines to the 10 Bit Comparator 3-7 are of course the free running cyclically repeating memory addresses given by the $\overline{T1}$ timing pulses from Timing Generator block 2. The READ OUT ADDRESS 10 LINES signals are generated by the 10 Bit Binary Counter 8-27 of the Read Out Sequencer, these memory addresses starting at zero and running sequentially through 1023 under control of the output buffer of the Output Data Encode and Control block 1-C.

Assuming that the Binary Counter 8-27 has from a previous output been cleared to its zero count, it is this zero memory location count which is read into the 10 Bit Comparator 3-7 in the Memory Address block as a static address. The memory addresses from Binary Counters 3-1 and 3-2 which are being fed also into 10 Bit Comparator 3-7 are of course changing to a higher count once each bit time. With the zero memory location statically presented to the 10 Bit Comparator 3-7 by 10 Bit Counter 8-27 of the Read Out Sequencer, the changing memory addresses fed into the Comparator 3-7 from counters 3-1 and 3-2 eventually arrives at that point in the cycle where the zero memory location address is presented to the Comparator. At that time the Read Out Address Compare signal RAC is generated and transmitted to Read Out Sequencer gate 8-25, the RAC signal persisting for one bit time.

The RAC signal address arises at time T1, and the next T3 timing signal is passed through gate 8-25 to the Count In input of counter 8-26 where it steps the Count Out from zero to "one" and transmits the "one" count to the Count In input of BCD to Decimal Decoder 8-18 causing the latter to shift its output count from a zero count to a "one" count. The "one" count output from Decoder 8-18 is transmitted over the data signal cable DS to the Output Data Encode and Control block 1-C where it causes the generation of a space character at the band rate. When the "one" output from Decoder 8-18 was routed to the Output Data Encoder, the BE signal was suppressed until such time as the Output Encoder had generated the space character. When the space character has been generated and transmitted, the BE signal again arises on gate 8-25. Since the baud rate is much slower than the terminal revolution rate, many intervening RAC signals will have been generated but will have been unable to pass any T3 timing pulses through gate 8-25 in the absence of the BE enabling signal.

With the return of the BE signal, the next memory comparison for the zero memory address location which produces an RAC signal will now cause the next T3 timing pulse to be gated through to the Count In input of Counter 8-26 and step its count, and hence the count of Decimal Decoder 8-18 from "one" to a "two" count. The "two" count signal from Decoder 8-18 passes through usage gate 8-17 to gates 8-6 and 8-15. Since gate 8-6 is enabled by the presence of a P signal form PR Flip-Flop 8-5, the decoder usage signal passes through gate 8-6 to PUE1 gate 8-12 where it is gated through as a PUE1 signal due to the presence of the enabling signal on the gate from Decimal Decoder 8-9. This PUE1 signal is transmitted to Memory block 5 where it enables passive usage memory output gate 5-13 and inhibits passive peg memory output gate 5-14.

Accordingly, the zero memory location of passive usage memory Shift Register 5-12 being then presented at the output of the register, the twelve bit output of the register is routed to the Output Data Encode and Control block 1-C where the output buffer accepts the four bits designating the most significant digit of that memory location count for transmission as an output character. The output buffer accepts the most significant four bits and not any of the other bits because it has been conditioned to do so by the "two" count output of the Decimal Decoder 8-18 which has also been transmitted to the Output Data Encode block 1-C via DS cable and strobes the four bits into the buffer. During the time that the most significant digit is being transmitted out at baud rate, the BE signal is of course again suppressed and nothing further occurs in the Read Out Sequencer.

When the most significant digit has been transmitted and the buffer empty signal BE again is present on gate 8-25, the next RAC signal will again gate through a T3 timing pulse and of course step the count out of the Decimal Decoder 8-18 from a "two" count to a "three" count. The "three" count is transmitted through gates 8-17, 8-6 and 8-12 to hold open memory output gate 5-13, and the "three" count which is transmitted over the DS cable to the Output Data Encode block 1-C now causes the second most significant digit four bit group to be strobed into the output buffer, again causing the BE signal to be suppressed. After the corresponding output character is generated, the process is again repeated so that the Decimal Decoder 8-18 is now shifted from its "three" count output state to its "four" count output state and the same process is repeated for transfer from the memory to the four bits corresponding to the least significant digit under control of the "four" count output from the Decimal Decoder 8-18.

At this point, the three decimal digits designating the usage interval count signals UIC have now been transmitted, and the next count of the Decimal Decoder 8-18, which occurs when the "four" count out is shifted to a "five" count out, presents no output signal to usage gate 8-17 so that the PUE1 signal out of gate 8-12 is terminated, thereby disabling memory passive usage output gate 5-13 so that the outputs of Shift Register 4-12 do not appear on the memory data output lines. The "five" count out of Decimal Decoder 8-18 is also routed via the DS cable to the Ouput Data Encode block 1-C where it generates a separation character, such as a slash symbol (/).

When the foregoing character has been generated, and in the now well known manner, the Decimal Decoder 8-18 has its output count shifted from "five" to "six", the "six" count passes through peg gate 8-19, through gate 8-7 and gate 8-13 to generate the PPE1 signal which appears at memory output gates 5-13 and 5-14, inhibiting gate 5-13 and enabling gate 5-14. Accordingly, the output of passive peg memory Shift Register 5-11 is now presented on the memory data lines to the Output Data Encode Control block 1-C. As in the case of the usage data, count "six" from Decimal Decoder 8-18 is also routed via the DS cable to the Output Data Encode block where it causes the Output Buffer to have strobed into it the four bits corresponding to the most significant digit of the peg event count signal PEC of zero memory address location.

The output data transmission continues in the manner previously described in connection with the usage data for the remaining two characters of the peg data. However, during the bit time when the least significant digit of the peg data is read out, a T8 timing pulse is gated through gate 8-28 which is enabled by the 8 count out of Decimal Decoder 8-18 and is routed to gate 8-29 but cannot pass therethrough because there is not Count 1023 signal on the latter gate since the count of 10 Bit Binary Counter 8-27 is still at zero memory address location count. However, the immediately following signal passes through gate 8-30 to clear the count in BCD Counter 8-26 back to zero and place a count into the Count In input of Binary Counter 8-27 to thereby change the READ OUT ADDRESS 10 LINES from the zero memory address code to the code for the memory address location 1. At this time, the three character usage data has been transmitted out of the terminal followed by the three character peg data for memory location zero and the process is about the be repeated for memory location 1.

In exactly the same manner as has just been described for the transmission of usage and peg data for memory location 1, the usage and peg data for each successive memory location is read out through the Output Data Encode and Control block 1-C until the last memory location 1023 has been read out. When the count in 10 Bit Binary Counter 8-27 advanced to Count 1023, an enabling signal was transmitted to gate 8-29 so that when the subsequent read out has been completed, at T8 time of the last four bit group transferred to the output buffer, a pulse is passed through gate 8-28 to gate 8-29, which latter being now enabled by the Count 1023 enabling signal from Binary Counter 8-27 passes a pulse through to reset the PRO Flip-Flop 8-5 and remove the enabling P signal from gates 8-6 and 8-7, clears the 3 Bit Binary Counter 8-22 back to a zero count, and is routed as a DSE signal to the Output Data Encode and Control clock 1-C where it causes the generation of a termination character signifying the end of the transmission. At the T9 time immediately following the generation of the DSE signal, a timing pulse passes through gate 8-30 to clear Counter 8-26 and set the BCD to Decimal Decoder 8-18 back to its zero count, and shifts the count in 10 Bit Binary Counter 8-27 back to zero in preparation for the next read out sequence to be generated in response to an appropriate command.

Also, shown by way of illustration are a group of gates 8-31 through 8-34 which are a group of gates comparable to the gates 8-10 through 8-13, the difference being that the group of gates 8-31 through 8-34 are the group of gates which would be enabled for read out of memory group 9. Accordingly, it will be understood that there are also present groups of four such gates for each of the other memory groups in the terminal, each such group of four gates having one input connected to one of the outputs of the BCD to Decimal Decoder 8-9.

Finally, had an active read out signal been the incoming command instead of the passive read out signal, Flip-Flop 8-14 would have enabled gates 8-15 and 8-16 so that the usage and peg signals from gates 8-17 and 8-19 would have caused the generation of the AUE1 and APE1 signals through gates 8-10 and 8-11. The AUE1 signal from gate 8-10 would have been applied to memory output gate 5-15, while the APE1 signal from gate 8-11 would have been applied to memory gate 5-16 to have caused an active memory read out in exactly the same manner as has been described for the passive memory read out.

A typical read out format is shown in FIG. 16 in which the first line contains the header information and the lines subsequent thereto contain the memory location data. The first character in the header indicates the memory group from which the data has been reached, and in this case identifies the B memory group. The next three characters typically would identify the bridge within which the memory group B is located. The 06/28 characters could represent the month and day while the 10/00 characters would represent the hour and minute at which the data was being transmitted. The remaining characters in the header convey other information such as whether or not the read out is to a local or a remote station, with the final character indicating passive memory read out. The line under the header designated as 000 represents the eight line address group corresponding to lines zero to seven for which the data appears on that line. The remainder of the format is similar, showing the read out of all 128 eight line address groups.

Having now described our invention in conjunction with a particularly illustrated embodiment thereof; it will be appreciated that modifications and variations of our invention may now naturally occur from time to time to those persons normally skilled in the art without departing from the essential scope or spirit of the invention, and accordingly, it is intended to claim the same broadly as well as indicated by the appended claims.

What is claimed to be new and useful is:

1. Event monitoring apparatus comprising in combination, a. monitor means for coupling to and cyclically selectively singly sequentially examining the signal conditions at a single point on each of a multiplicity of independant monitored signal circuits, a cycle time being that time required to sequentially examine all of said circuits once, b. first means coupled to said monitor means and effective at multiple cycle intervals for detemining for each monitored signal circuit whether or not an event has occured on that circuit, and for generating a first data signal whenever an event has been determined to have occurred, c. second means coupled to said monitor means effective for each signal circuit during the time interval when an event is determined to have occured on that circuit to generate a second data signal, said second data signal representing the length of time during which the monitored occured event persisted.

2. Apparatus as set forth in claim 1 wherein said first means comprises event occurance validation means operative to examine each monitored signal circuit signal condition during a plurality of sequential cycles and detemine and remember whether there is event data present or event data absent, and, effective responsive to a determination of event data present for a first preselected plurality of cycles followed by a determination of event data absent for a second preselected plurality of cycles at the same monitored signal circuit to generate said first data signal.

3. Apparatus as set forth in claim 1 further including data signals storage means effective to store said first and second data signals for each monitored signal circuit, and event incrementing means coupled to said first and second means to said data signals storage means effective to increment the stored data signals for each monitored signal circuit in accordance with the generation of first and second data signals.

4. Apparatus as set forth in claim 1 wherein said first means comprises event occurance validation means operative to examine each monitored signal circuit signal condition during a plurality of sequential cycles and determine and remember whether there is event data present or event data absent, and, effective responsive to a determination of event data present for a first preselected plurality of cycles followed by a determination of event data absent for a second preselected plurality of cycles at the same monitored signal circuit to generate said first data signal, and further including data signals storage means effective to store said first and second data signals for each monitored signal circuit, and event incrementing means coupled to said first and second means and to said data signals storage means effective to increment the stored data signals for each monitored signal circuit in accordance with the generation of first and second data signals.

5. Apparatus as set forth in claim 1 wherein said second means generates second data signals which each represent a predetermined length of time during which the monitored occured event persisted, whereby, said second means may generate more than one of said second data signals for each said first data signal generated by said first means.

6. Apparatus as set forth in claim 1 wherein said monitor means comprises parallel to serial electrical signal input multiplexer means having an output circuit and a plurality of independent input circuits, each said input circuit being cyclically selectively singly sequentially operatively coupled to said output circuit for a predetermined time interval to thereby deliver to said output circuit a sequence of electrical signals corresponding to the signal condition on each of said input circuits during the time interval that the particular selected input circuit is coupled to the said output circuit, said output circuit having a plural output points one of which when active representing an event data present condition and another of which when active representing an event data absent condition, said first and second means being coupled to said multiplexer output circuit.

7. Apparatus as set forth in claim 2 wherein said first preselected plurality of cycles equals three cycles.

8. Apparatus as set forth in claim 2 wherein said second means generates said second data signal during the time when said event occurance validation means examines for event present conditions on said monitored signal circuits.

9. Apparatus as set forth in claim 2 wherein said event occurrence validation means comprises cycle selection means for selecting those ones of successive cycles during which said monitored signal circuits are examined.

10. Apparatus as set forth in claim 4 wherein said first preselected plurality of cycles and said second preselected plurality of cycles are the same as and are equal to three cycles.

11. Apparatus as set forth in claim 4 wherein said data signals storage means comprises, a. first and second accumulating storage means for accumulating and storing the incremented first and second data signals respectively for each monitored signal circuit, said accumulating storage means each having input and output means, b. first and second non-actuating storage means each having input and output means, and c. storage transfer means coupling said accumulating storage means output means to said non-accumulating storage means input means and effective when enabled to transfer said first and second data signals respectively from said first and second accumulating storage means to said first and second non-accumulating storage means.

12. Apparatus as set forth in claim 5 further including means for selecting the said predetermined length of time represented by each said second data signal.

13. Apparatus as set forth in claim 5 wherein said first means comprises event occurrence validation means operative to examine each monitored signal circuit signal condition during a plurality of sequential cycles and determine and remember whether there is event data present or event data absent, and, effective responsive to a determination of event data present for a first preselected plurality of cycles followed by a determination of event data absent for a second preselected plurality of cycles at the same monitored signal circuit to generate said first data signal.

14. Apparatus as set forth in claim 9 wherein said cycle selection means comprises means providing for examination of said monitored signal circuits during immediately successive cycles or during successive cycles spaced apart by integral multiples of a cycle.

15. Apparatus as set forth in claim 11 further including means coupled to said storage transfer means for enabling the latter.

16. A plurality of groups of apparatus, each such group comprising apparatus as set forth in claim 11, and selectively enableable storage read out means coupled to said output means of said accumulating and non-accumulating storage means of each group of said plurality of groups of apparatus, and read out enabling means coupled to said storage read out means effective for selectively enabling the latter to thereby read out the data stored in the associated first or second accumulating or non-accumulating storage means.

17. Apparatus as set forth in claim 13 wherein said event occurrence validation means comprises cycle selection means for selecting those one of successive cycles during which said monitored signal circuits are examined.

18. Apparatus as set forth in claim 17 further including means for selecting the said predetermined length of time represented by each said second data signal.

19. A method of monitoring acitvity on a plurality of signal circuits to collect data from which it may be determined how often activity is present and the time duration of such activity for each signal circuit, consisting of the steps of, a. Coupling monitor means to a plurality of signal circuits and causing said monitor means to cyclically selectively singly sequentially examine the signal condition at a single point on each of said plurality of signal circuits during a plurality of sequential cycles, a cycle time being that time required to sequentially examine all of said signal circuits once, b. testing from the monitor means, and storing an indicator denoting, whether there is activity present or activity absent during each monitored signal circuit examination, c. testing, for each monitored signal circuit, for a particular one of said indicators which indicates that activity has been present for at least a first preselected plurality of cycles and has been absent for a subsequent second preselected plutality of cycles, and in response thereto generating a first data signal representing the detection of such condition, d. measuring from the monitor means for each monitored signal circuit for which a first data signal is generated the length of time during which activity was present and generating second data signals representing such length of time.

20. The method set forth in claim 19 including the further steos of, a. storing as a count each of said first and second data signals for each monitored signal circuit, and
b. incrementing the stored data signals counts for each monitored signal circuit in accordance with the generation of subsequent first and second data signals.

21. The method set forth in claim 19 wherein the said particular one of said indicators is selected to indicate that activity has been present for at least three cycles and has been subsequently absent for three cycles.

22. The method set forth in claim 19 wherein the said step of measuring the length of time during which activity was present and generating the second data signals representing such length of time consists of the steps of generating signals each corresponding to a predetermined time interval during which the monitored activity was present.

23. The method set forth in claim 19 wherein said step of testing from the monitor means and storing an indicator denoting whether there is activity present or activity absent during each monitored signal circuit examination is carried out for each monitored signal circuit during immediately successive cycles.

24. The method set forth in claim 19 wherein said step of testing from the monitor means and storing an indicator denoting whether there is activity present or activity absent during each monitored signal circuit examination is carried out for each monitored signal circuit during successive cycles spaced apart by integral multiples of a cycle.

25. The method set forth in claim 19 wherin steps (b) and (d) are carried on concurrently.

26. The method set forth in claim 20 wherein the said steps of storing and incrementing the stored data signal counts for each monitored signal circuit consist of performing these steps and storing the said data signal counts in an accumulating store, and the further step of transferring to a non-accumulating store the said data signal counts in the said accumulating store.

27. The method set forth in claim 22 wherein the length of said predetermined time interval to which said second data signals correspond is selectable, the method including a further step of selecting second data signals corresponding to a particular time interval.

28. The method set forth in claim 24 wherein the said step of measuring the length of time during which activity was present and generating second data signals representing such length of time consists of the steps of generating signals each corresponding to a predetermined time interval during which the monitored activity was present.

29. The method set forth in claim 26 wherein said step of transferring the said data signals counts from the accumulating store to the non-accumulating store is carried out only upon specific command.

30. The method set forth in claim 26 further including the step of selecting one of said accumulating store, and said non-accumulating store and transferring the said data signal counts therein to an output circuit.

31. The method as set forth in claim 26 wherein the step of measuring the length of time during which activity was present and generating second data signals representing such length of time consists of generating signals each corresponding to a predetermined time interval during which the monitored activity was present.

32. The method set forth in claim 28 wherein the length of said predetermined time interval to which said second data signals correspond is selectable, the method including the further step of selecting second data signals corresponding to a particular time interval.

* * * * *

UNITED STATES PATENT AND TRADEMARK OFFICE

CERTIFICATE OF CORRECTION

PATENT NO. : 3,916,123

DATED : October 28, 1975

INVENTOR(S) : LEROY H. WERNER AND JOHN E. LITZINGER

It is certified that error appears in the above-identified patent and that said Letters Patent are hereby corrected as shown below:

In the drawings, Sheet 2, Fig. 2, the reference numeral 2-3 should be applied to the BCD TO TERMINAL DECODER which should be read as BCD TO DECIMAL DECODER, and the reference numeral 2-4 should be applied to the divide by 10 network which inputs to the Decoder 2-3; Sheet 7, Fig. 8, add a lead line from reference numeral 8-18 to BCD TO DECIMAL DECODER. Abstract cover page, representative figure shown is not part of this patent, Figure 1 of the drawings should be used. Column 1, lines 61-62, for "indentified" read -- identified --. Column 2, line 1, for "shown" read -- show --. Column 4, line 1, for "privisions" read -- provisions --; line 41, for "aan" read -- an --. Column 7, line 31, for "PPE" read -- PPE3 --. Column 10, line 66, for "form" read -- from --. Column 11, line 50, for "4-9" read -- 4-8 --; line 56, for "form" read -- from --. Column 12, line 30, for "bianry" read -- binary --; line 32, for "Therefore" read -- Therefore --. Column 13, line 39, cancel the entire line; line 40, cancel "gates the "one"". Column 14, line 8, for "4-" read -- 4-14 --; line 10, for "alos" read -- also --. Column 17, line 3, for "annd" read -- and --; line 12, for "shfit" read -- shift --. Column 18, line 59, for "gate" read -- gates --. Column 19, line 4, for "Tranns-" read -- Trans- --; line 23, for "signnal" read

UNITED STATES PATENT AND TRADEMARK OFFICE

CERTIFICATE OF CORRECTION

PATENT NO. : 3,916,123

DATED : October 28, 1975

INVENTOR(S) : LEROY H. WERNER AND JOHN E. LITZINGER

It is certified that error appears in the above-identified patent and that said Letters Patent are hereby corrected as shown below:

-- signal --; line 27, after "signal" insert -- is --; line 41, before "Shift" for "to" read -- of --. Column 20, line 12, for "signals" read -- signal --; line 32, for "Tje" read -- The --. Column 21, line 4, after "which" insert -- of --; lines 62 and 64 for "Comparater" read -- Comparator --. Column 22, line 35 (printed as line 36), for "surpresses" read -- suppresses --. Column 23, line 53, for "Selection" read -- Selective --; line 60, for "mempory" read -- memory --. Column 24, line 36 after "or" insert -- 1024 bit times, --; line 42, for "G24" read -- 6-42 --; line 50, after "CLEAR" insert -- Ø through CLEAR --. Column 25, line 5, after "stores" insert -- data --; line 6, for "PEG" read -- PEC --; line 10, for "PEG" read -- PEC --; line 47 for "FIG. 2" read -- FIG. 5 --. Column 26, line 4, for "PEE1" read -- PPE1 --; line 51, after "that" insert -- when --. Column 27, line 30, for "band" read -- baud --; line 50, for "form" read -- from --. Column 28, line 35, for "4-12" read -- 5-12 --; line 64, for "not" read -- no --. Column 29, line 8, after "about" for "the" read -- to --. Column 30, line 20, after "as" insert -- specifically as --; claim 1, line 10, for "detemining" read -- determining --; claim 1, line 5, for "detemine" read -- determine --; claim 3, line 5, after "means" insert -- and --. Column 31, claim 10,

UNITED STATES PATENT AND TRADEMARK OFFICE

CERTIFICATE OF CORRECTION

PATENT NO. : 3,916,123

DATED : October 28, 1975

INVENTOR(S) : LEROY H. WERNER AND JOHN E. LITZINGER

It is certified that error appears in the above-identified patent and that said Letters Patent are hereby corrected as shown below:

line 3, cancel "as"; claim 11, line 8, for "non-actuating" read -- non-accumulating --. Column 32, claim 19, line 21, for "plutality" read -- plurality --. Column 33, claim 20, line 2, for "steos" read -- steps --.

Signed and Sealed this

Tenth Day of August 1976

[SEAL]

*Attest:*

RUTH C. MASON
*Attesting Officer*

C. MARSHALL DANN
*Commissioner of Patents and Trademarks*